United States Patent [19]
Fouche et al.

[11] Patent Number: 5,311,550
[45] Date of Patent: May 10, 1994

[54] TRANSMITTER, TRANSMISSION METHOD AND RECEIVER

[75] Inventors: Yvon Fouche, Chatenay Malabry; Philippe Elleaume, Antony; Tristan de Couasnon, Betton; Serge Travert, Cesson Sevigne; Raoul Monnier, Rennes; Stephane Hergault, Cesson Sevigne, all of France

[73] Assignee: Thomson-CSF, Puteaux, France

[21] Appl. No.: 678,262

[22] PCT Filed: Oct. 20, 1989

[86] PCT No.: PCT/FR89/00546

§ 371 Date: Apr. 22, 1991

§ 102(e) Date: Apr. 22, 1991

[87] PCT Pub. No.: WO90/04893

PCT Pub. Date: May 3, 1990

[30] Foreign Application Priority Data

Oct. 21, 1988 [FR] France ................ 88 13832
Oct. 21, 1988 [FR] France ................ 88 13833

[51] Int. Cl.⁵ ............................................. H04L 27/28
[52] U.S. Cl. ............................................. 375/38; 370/19
[58] Field of Search ............... 375/38, 40, 94; 370/19, 370/23

[56] References Cited

U.S. PATENT DOCUMENTS

3,456,202  7/1969  Miyagi .
4,881,241  11/1989  Pommier et al. ............... 375/38

OTHER PUBLICATIONS

EBU Review Technical, Nr 224, Aug. 1987 (Bruxelles, BE), M. Alard et al.: "Principles of modulation and channel coding for digital broadcasting for mobile receivers", pp. 168–190.
IEEE Transactions on Communications, vol. COM-34, Nr 6, Jun. 1986 IEEE, (New York, US), B. Hirosaki et al: "Advanced groupband data modem using orthogonally multi-lexed QAM technique" pp. 587–592.
IEEE Transactions on Communications, vol. COM-20, Nr 3, Jun. 1972, (New York, US), U. Timor: "Equivalence of time-multiplexed and frequency-multiplexed signals in digital communications" pp. 435–438.

Primary Examiner—Stephen Chin
Assistant Examiner—T. Ghebretinsae
Attorney, Agent, or Firm—Oblon, Spivak, McClelland, Maier & Neustadt

[57] ABSTRACT

A transmission method and a transmitter and receiver Structure is disclosed which provides for transmission of modulated waves using long pulses with a plurality of frequencies. The method involves two consecutive frequencies being separated by 1/T, where T is the period of the useful transmission intervals. The method and the apparatus are particularly suited to broadcasting and reception of television and radio signals as well as telephone communications between exchanges and between radio telephones and communication stations including terrestrial stations and satellites and local computer networks. Most particularly the method is applicable to high fidelity radio transmissions as well as to high definition television (HDTV).

19 Claims, 15 Drawing Sheets

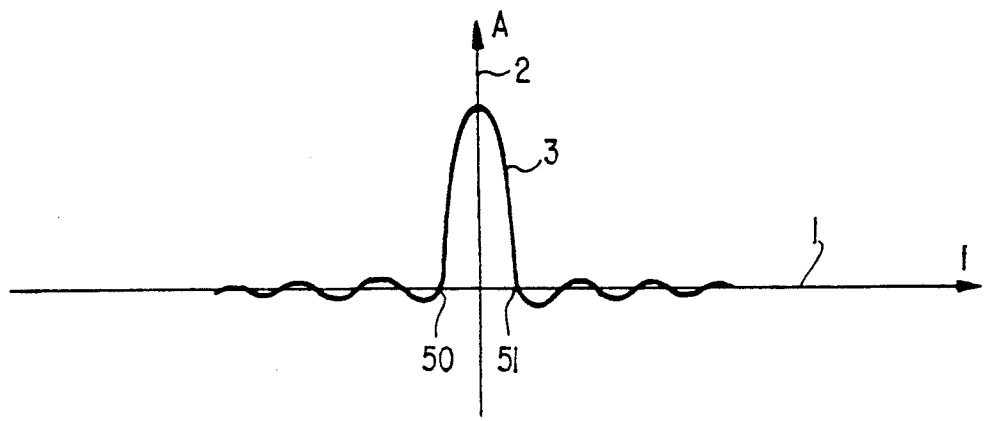
FIG_1
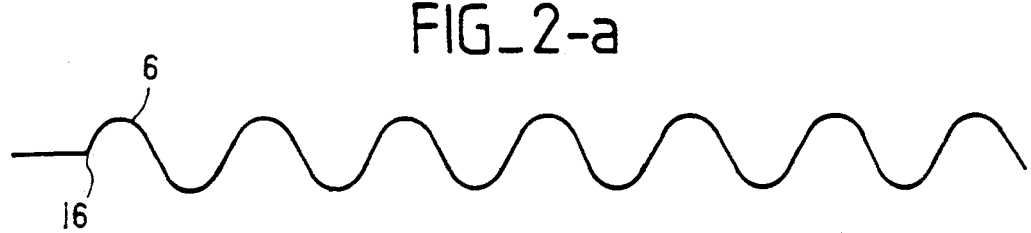
FIG_2-a
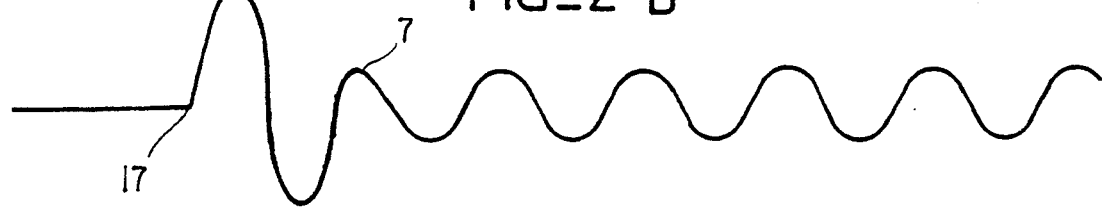
FIG_2-b
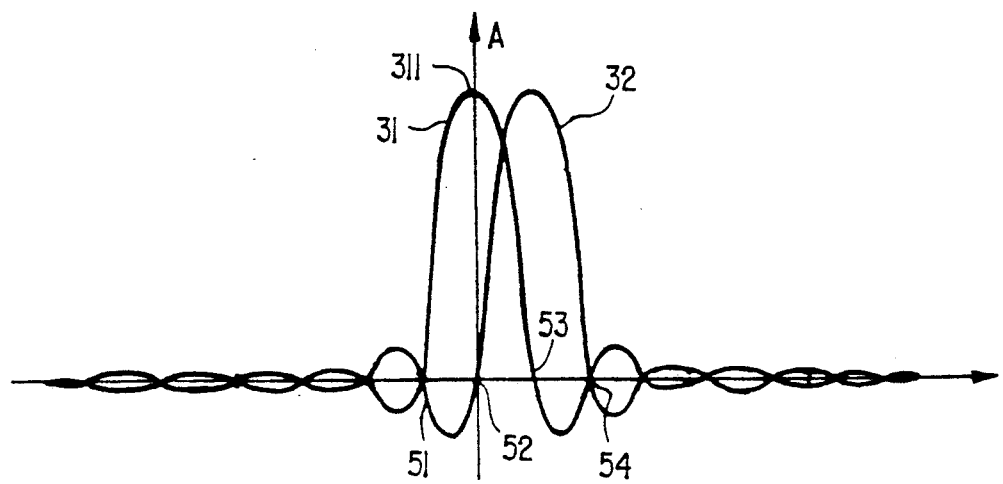
FIG_3

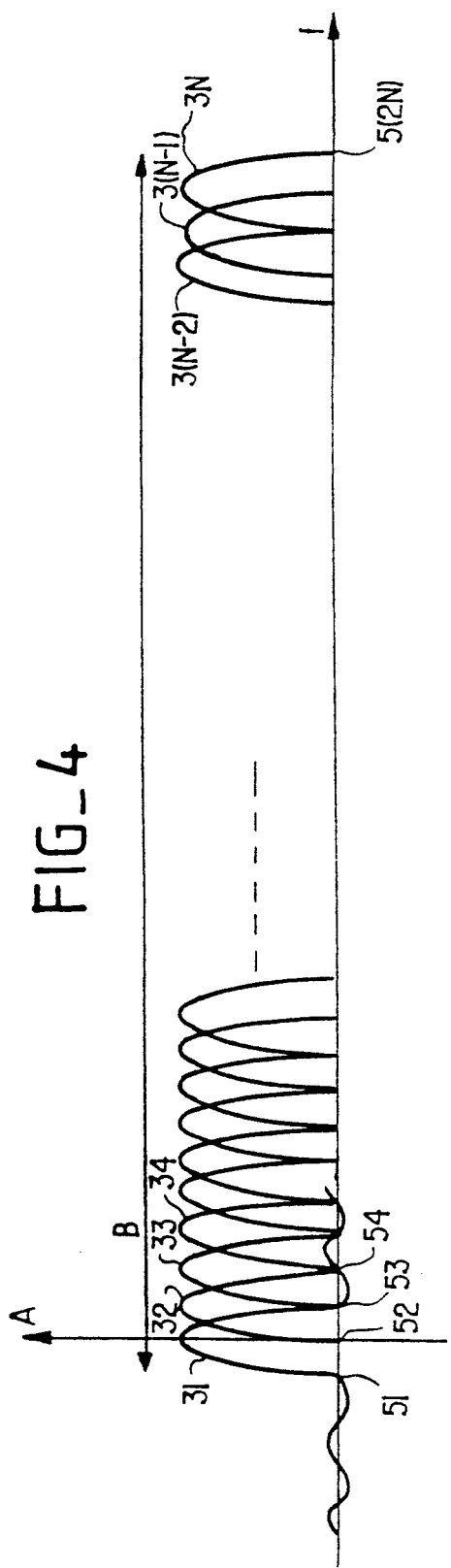
FIG_4
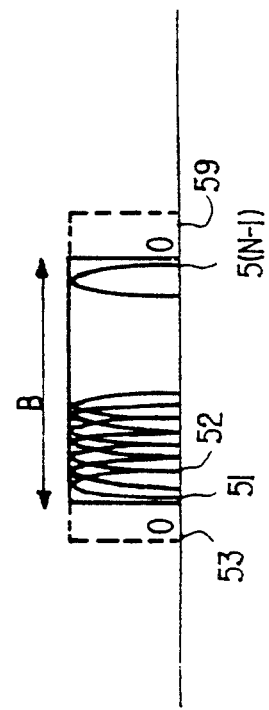
FIG_5

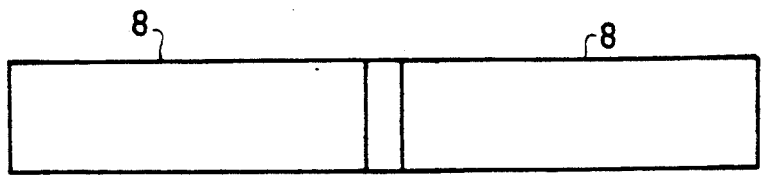
FIG_6-a
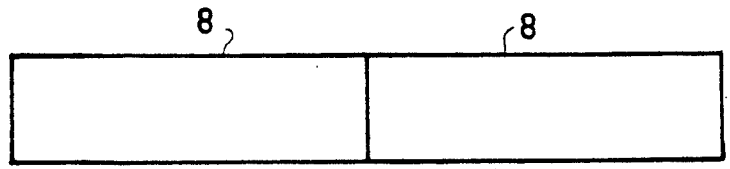
FIG_6-b
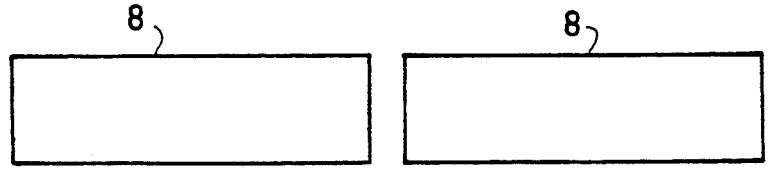
FIG_6-c
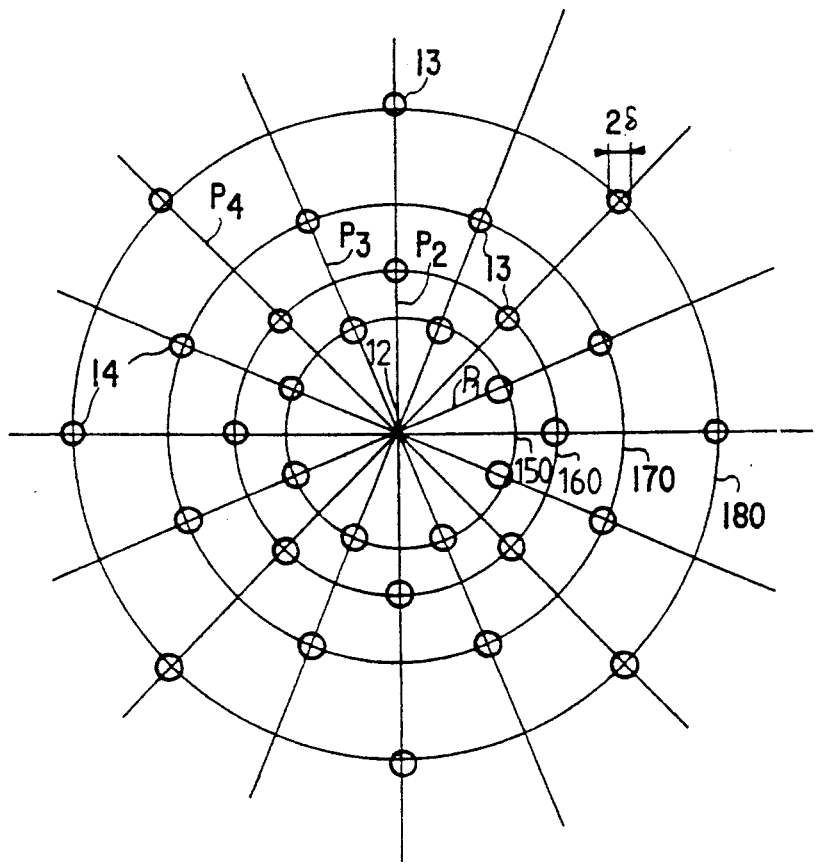
FIG_7

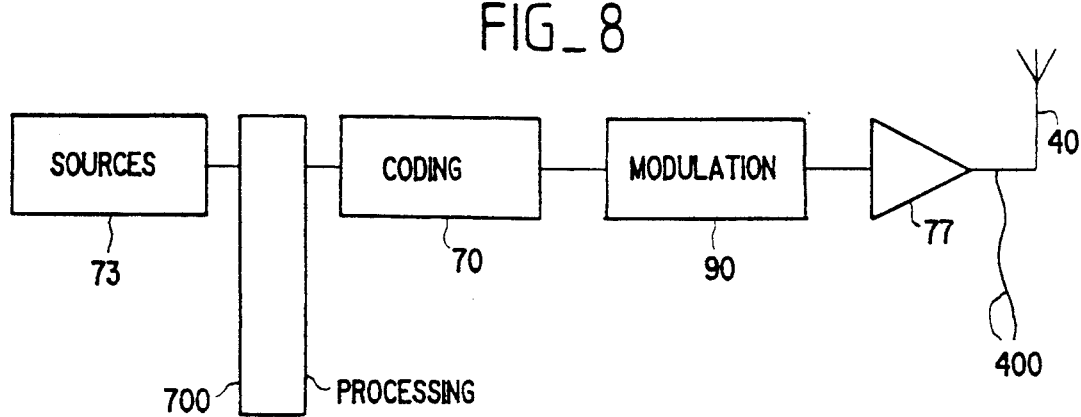
FIG_8
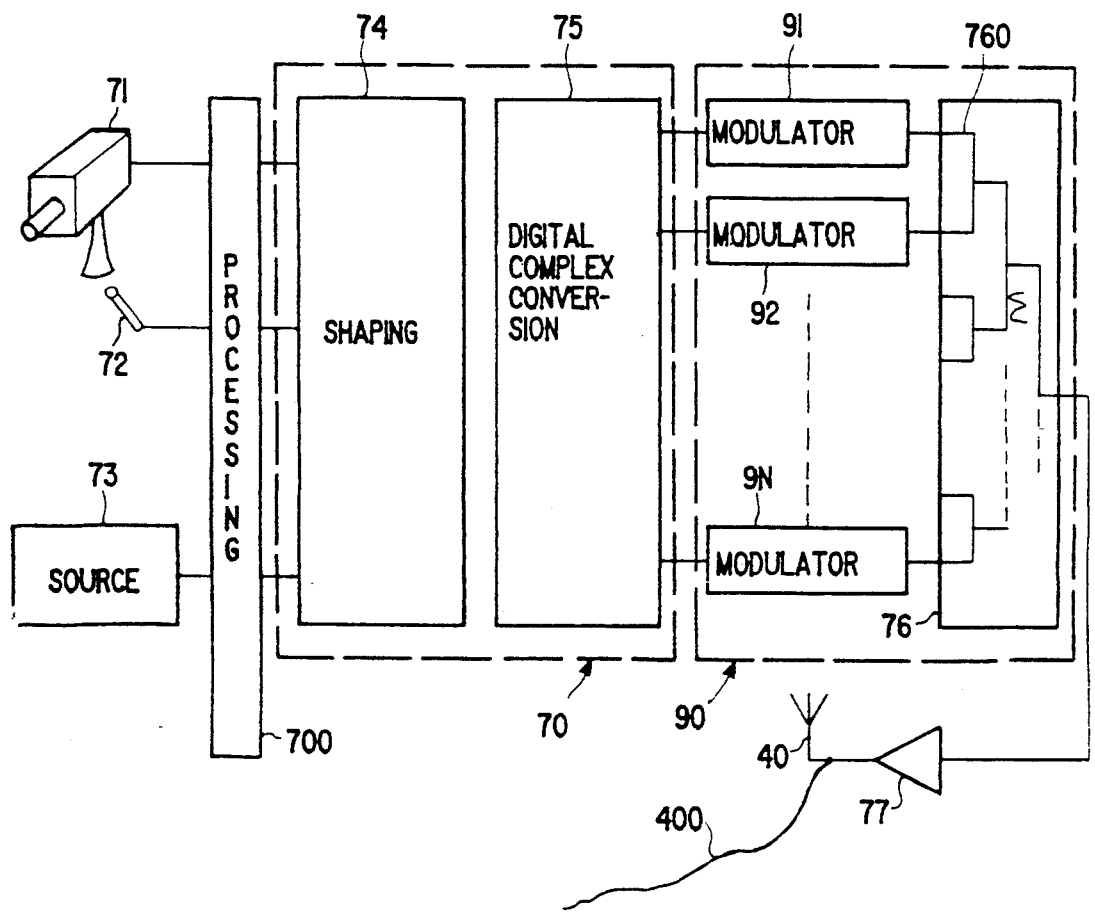
FIG_10

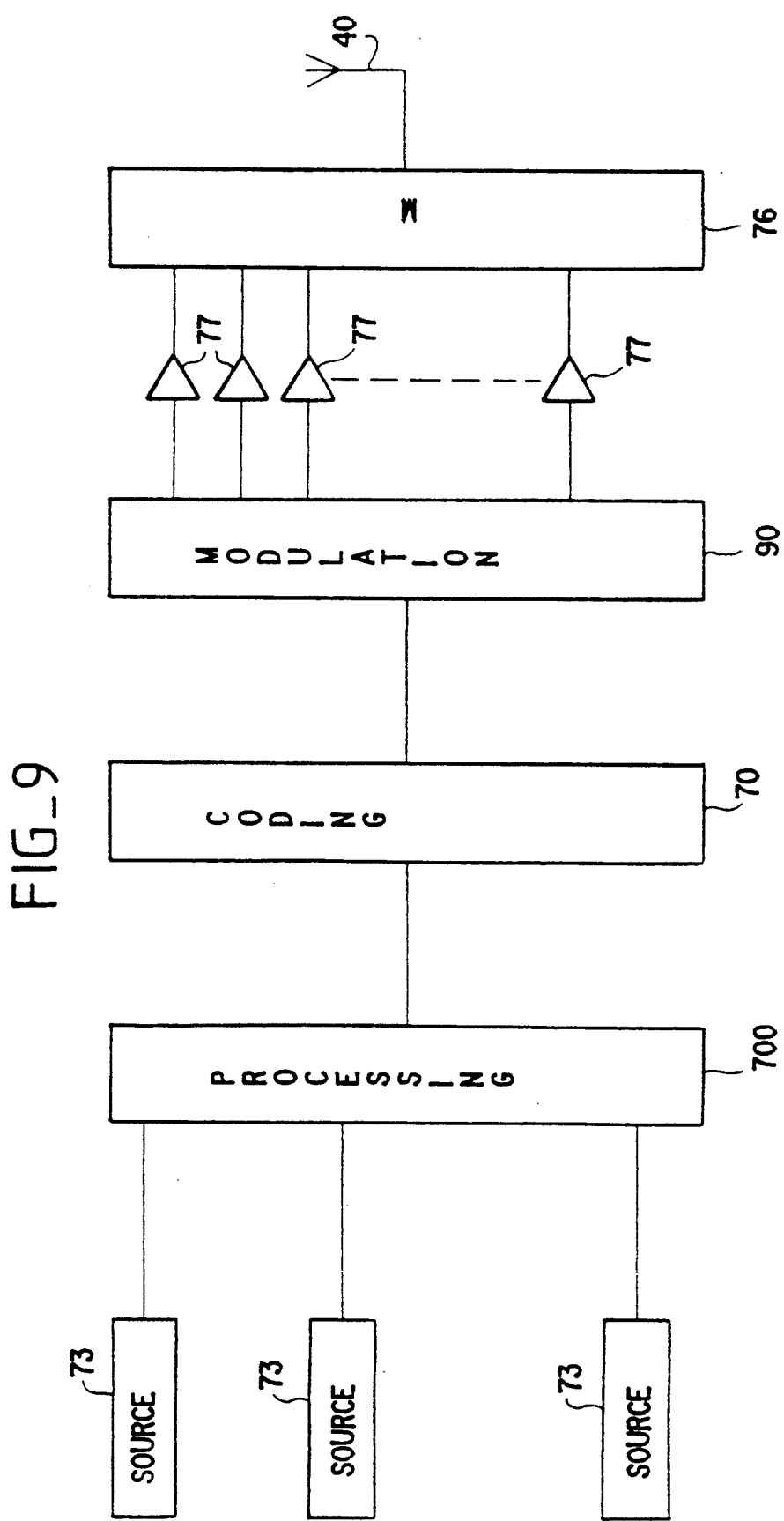

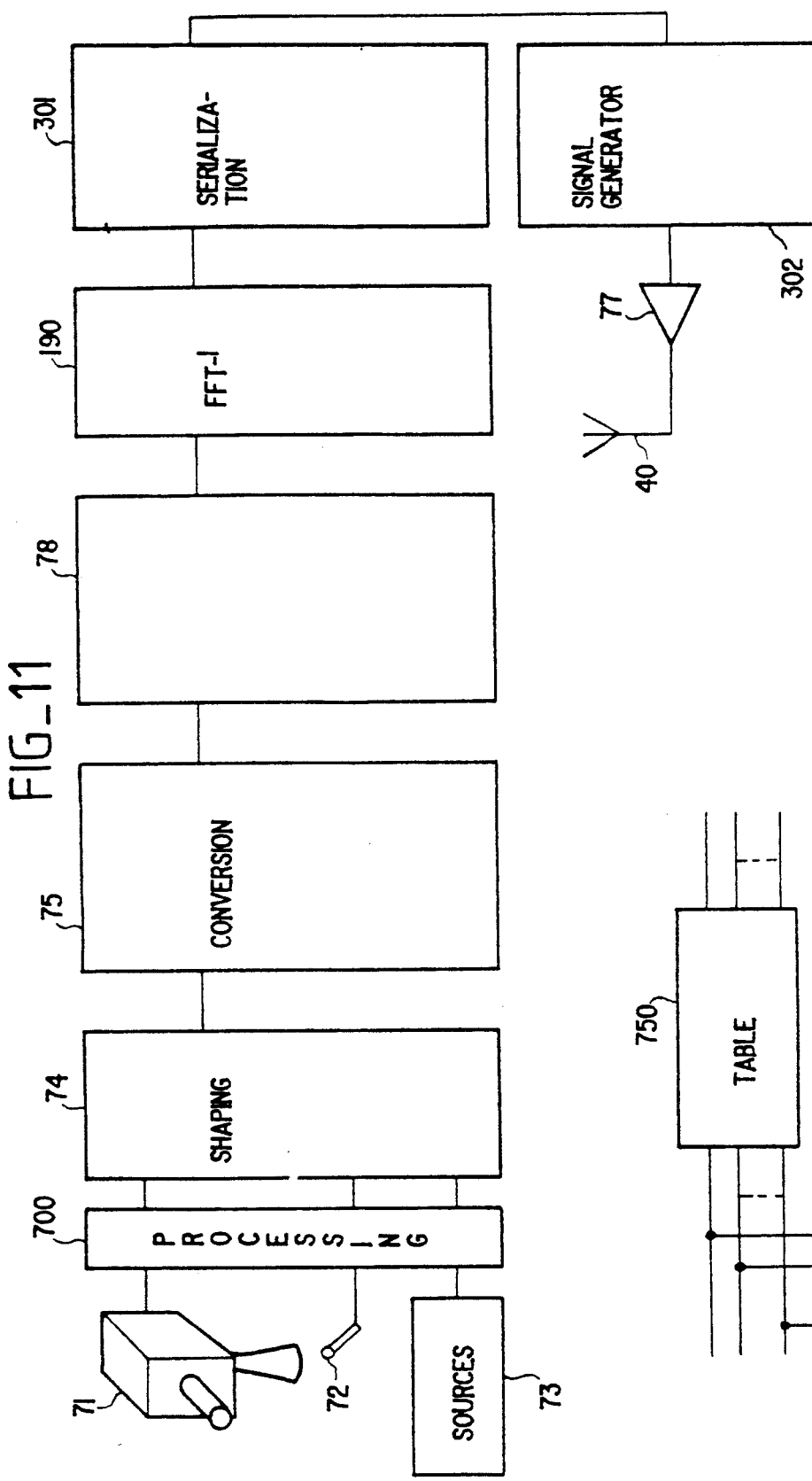
FIG_11
FIG_12

FIG_13
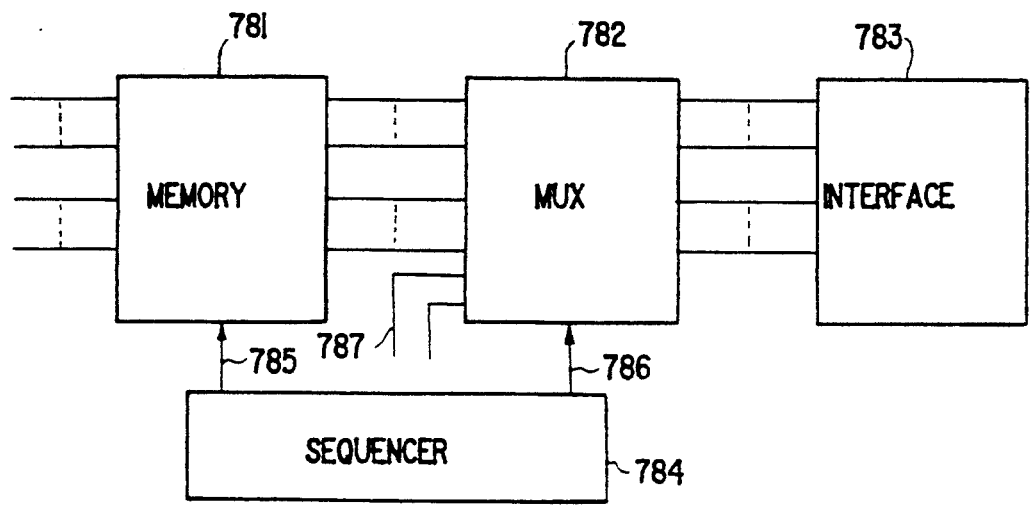
FIG_14
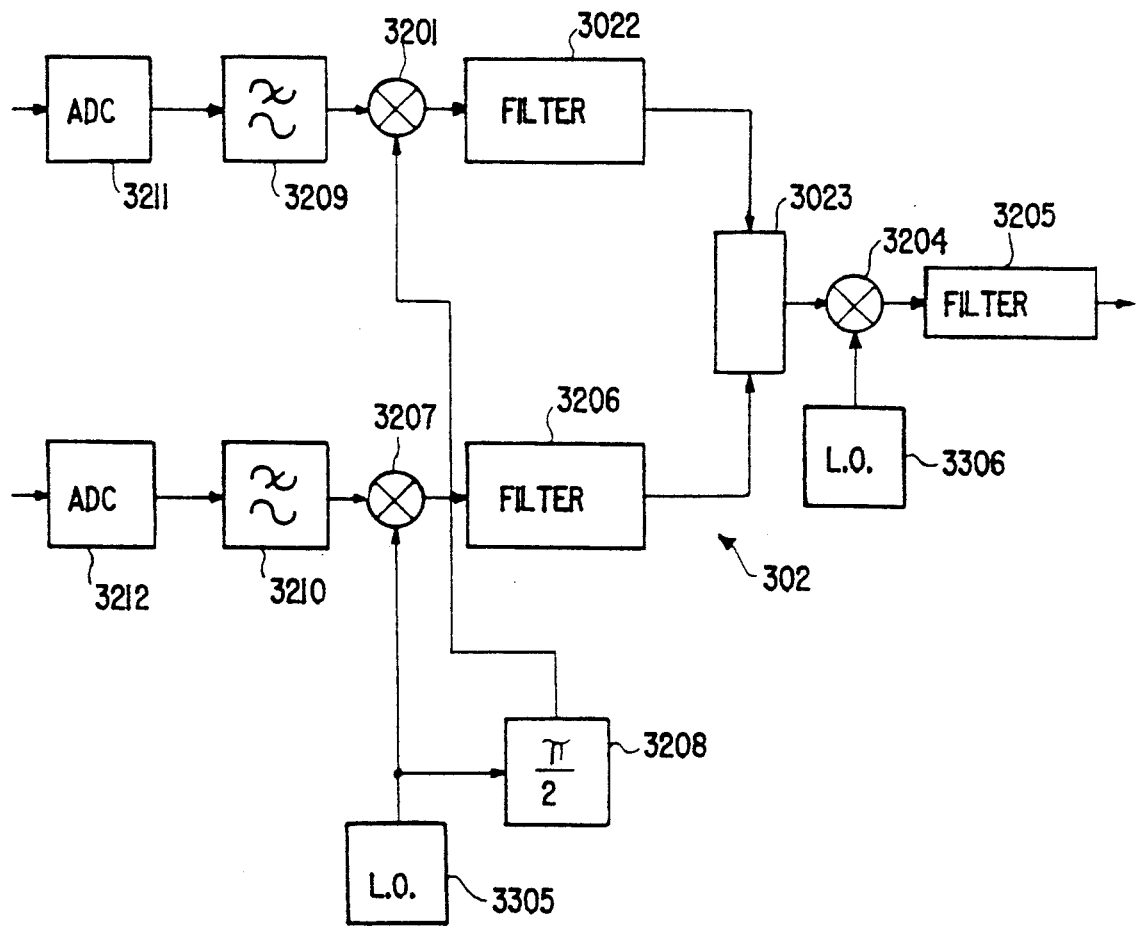

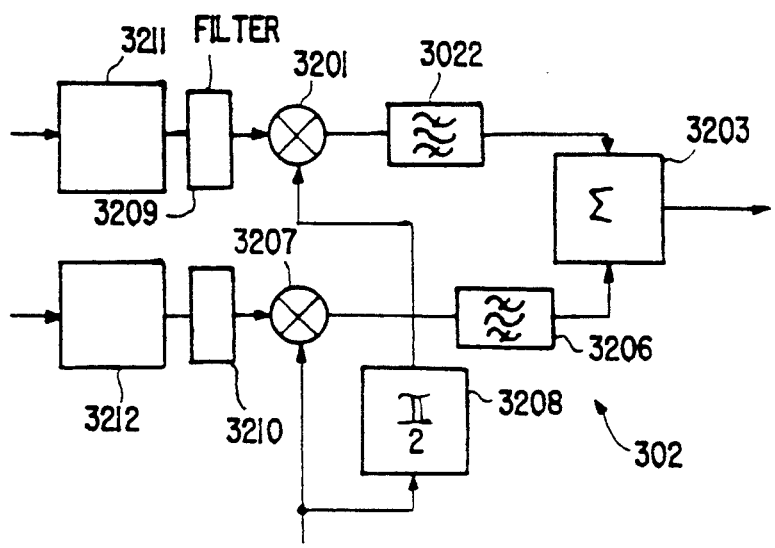
FIG_15
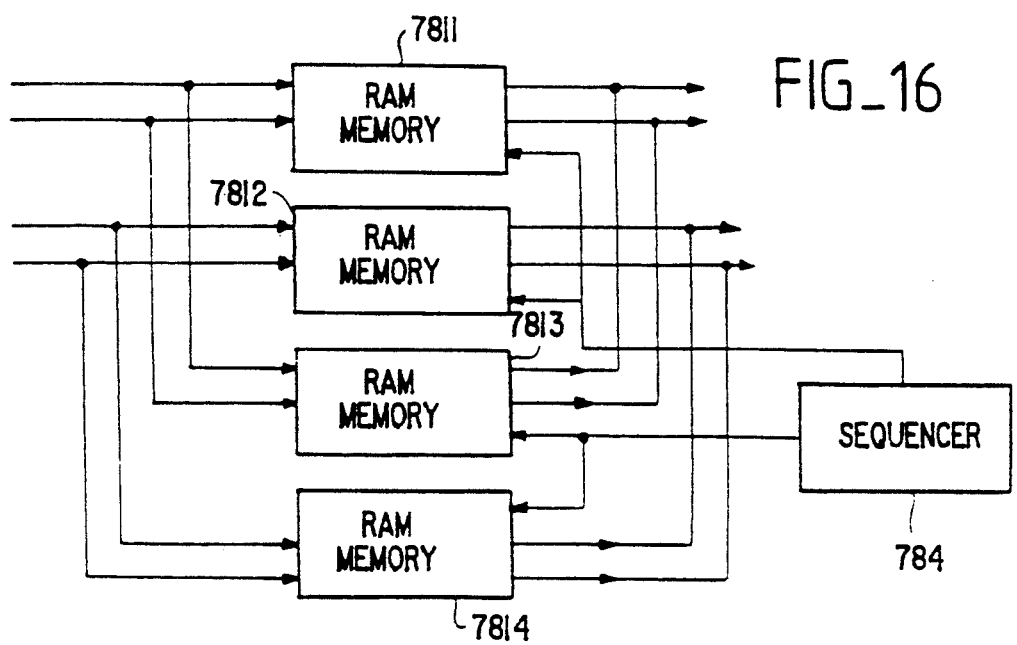
FIG_16
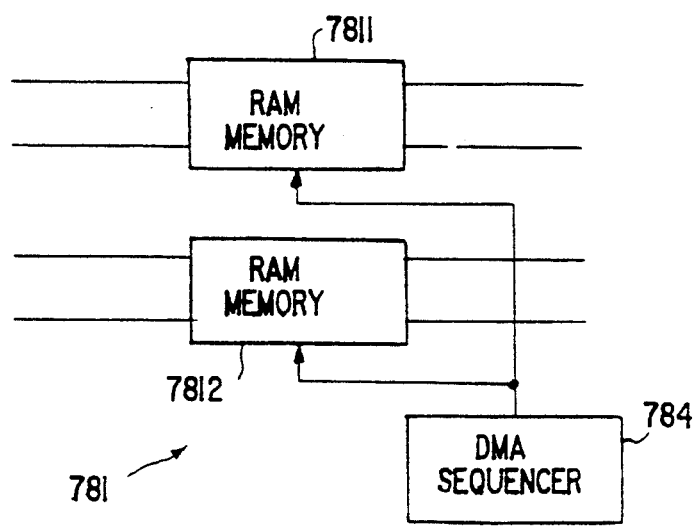
FIG_17

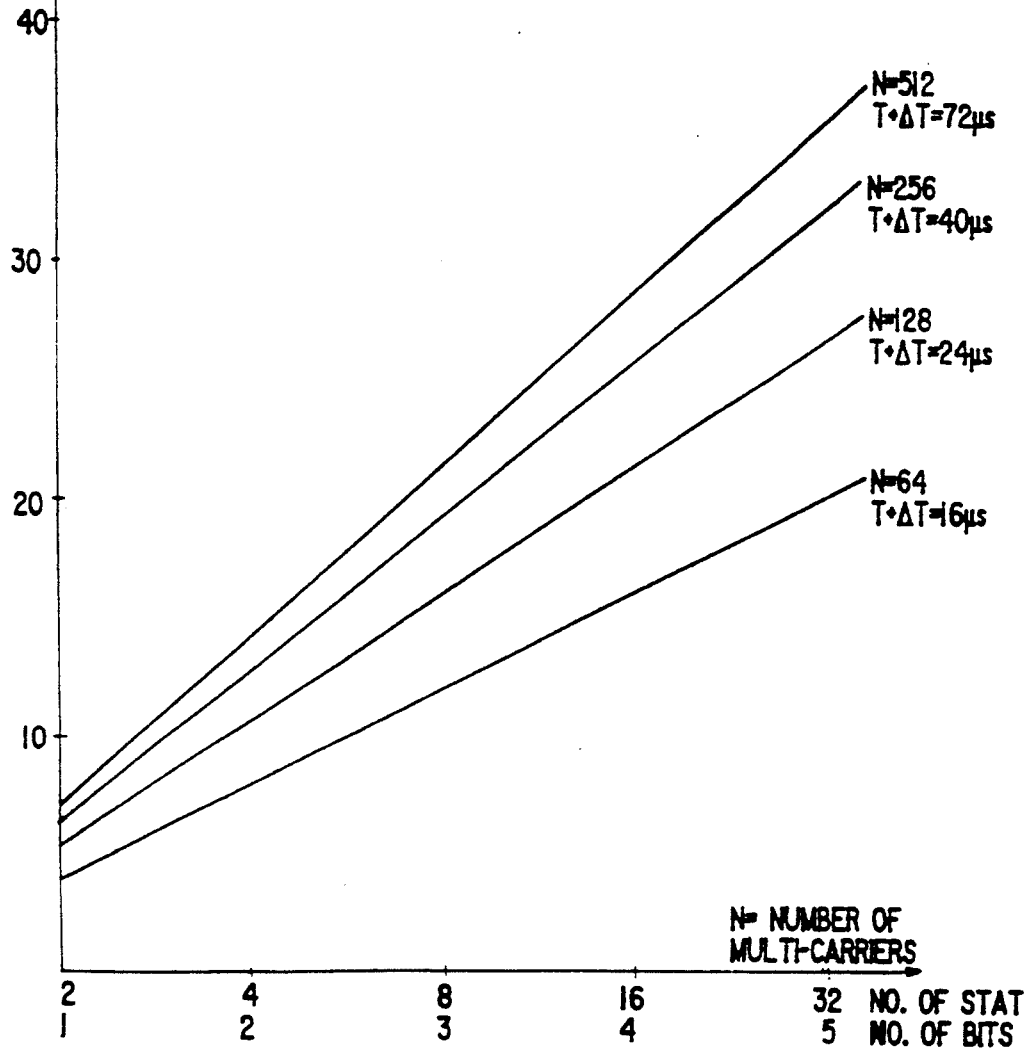
FIG_18
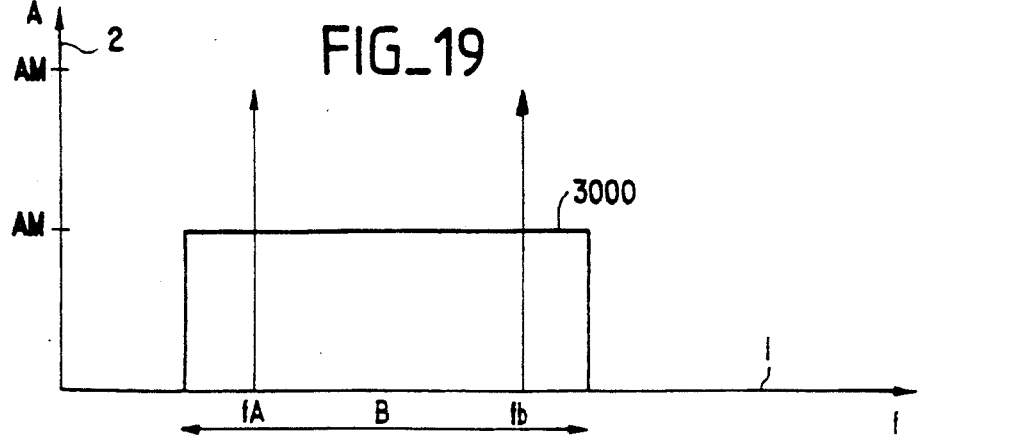
FIG_19

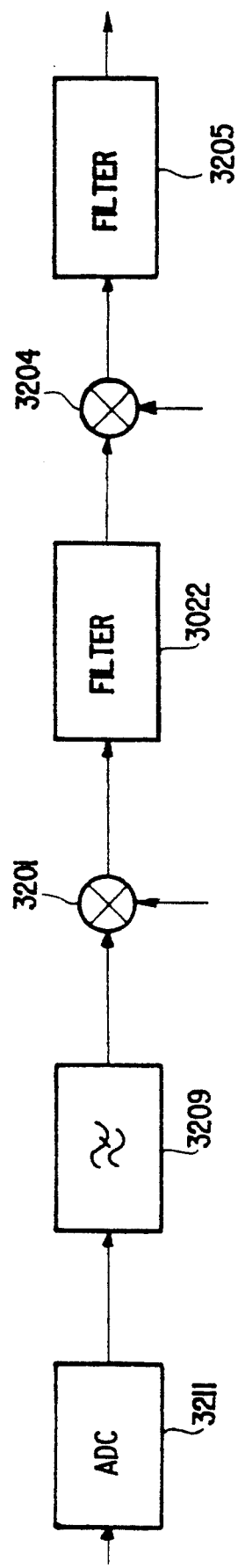
FIG_20

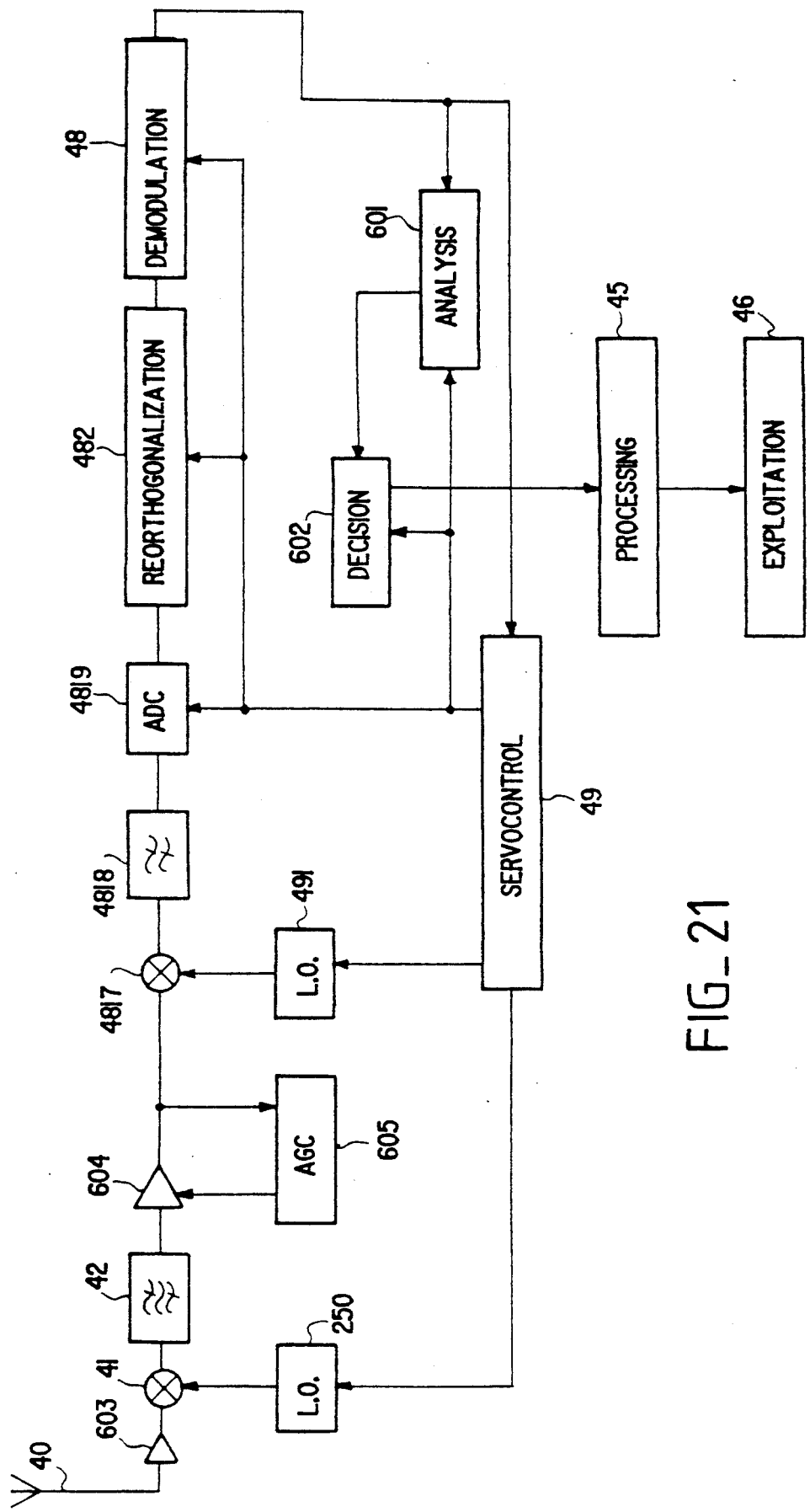
FIG_21

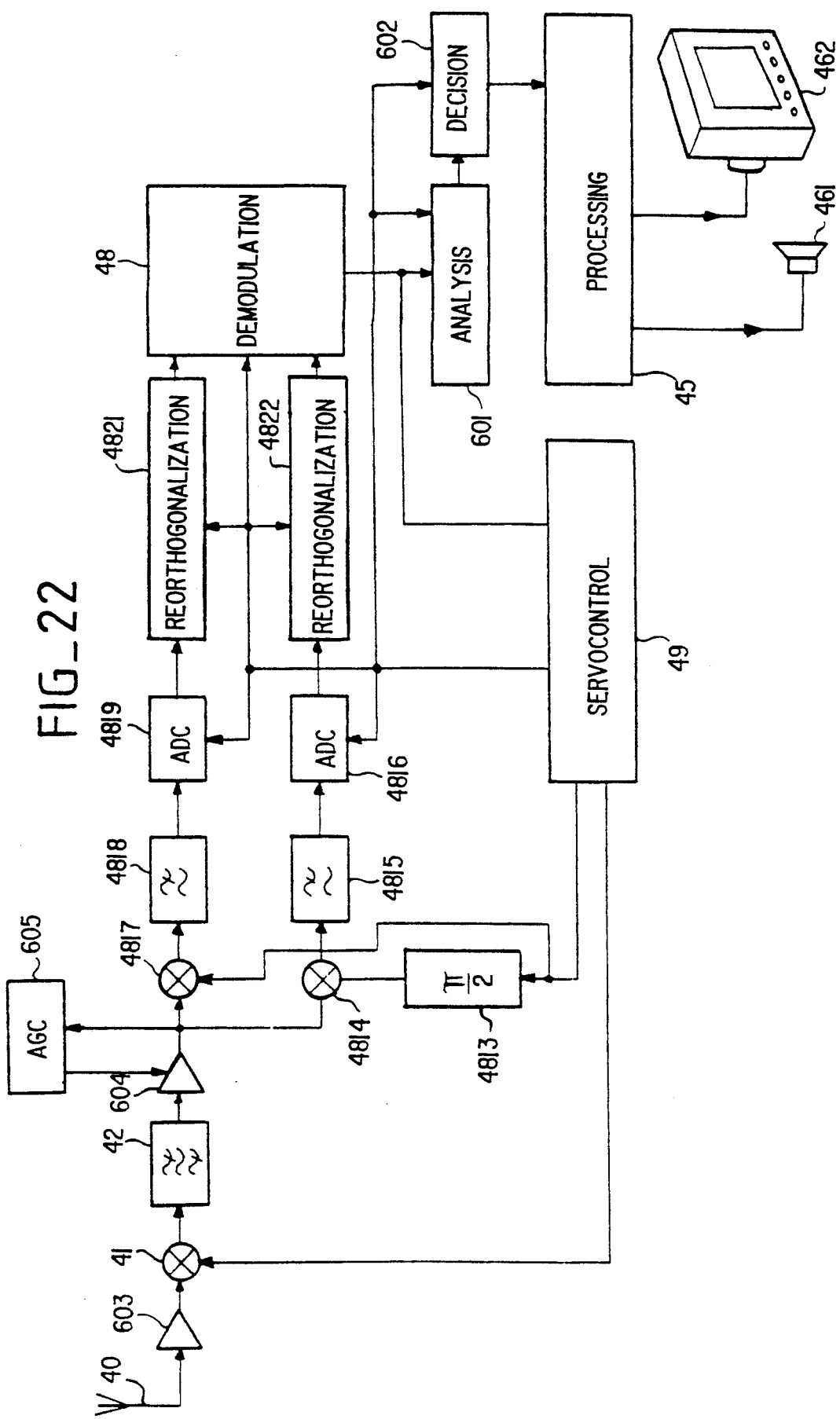

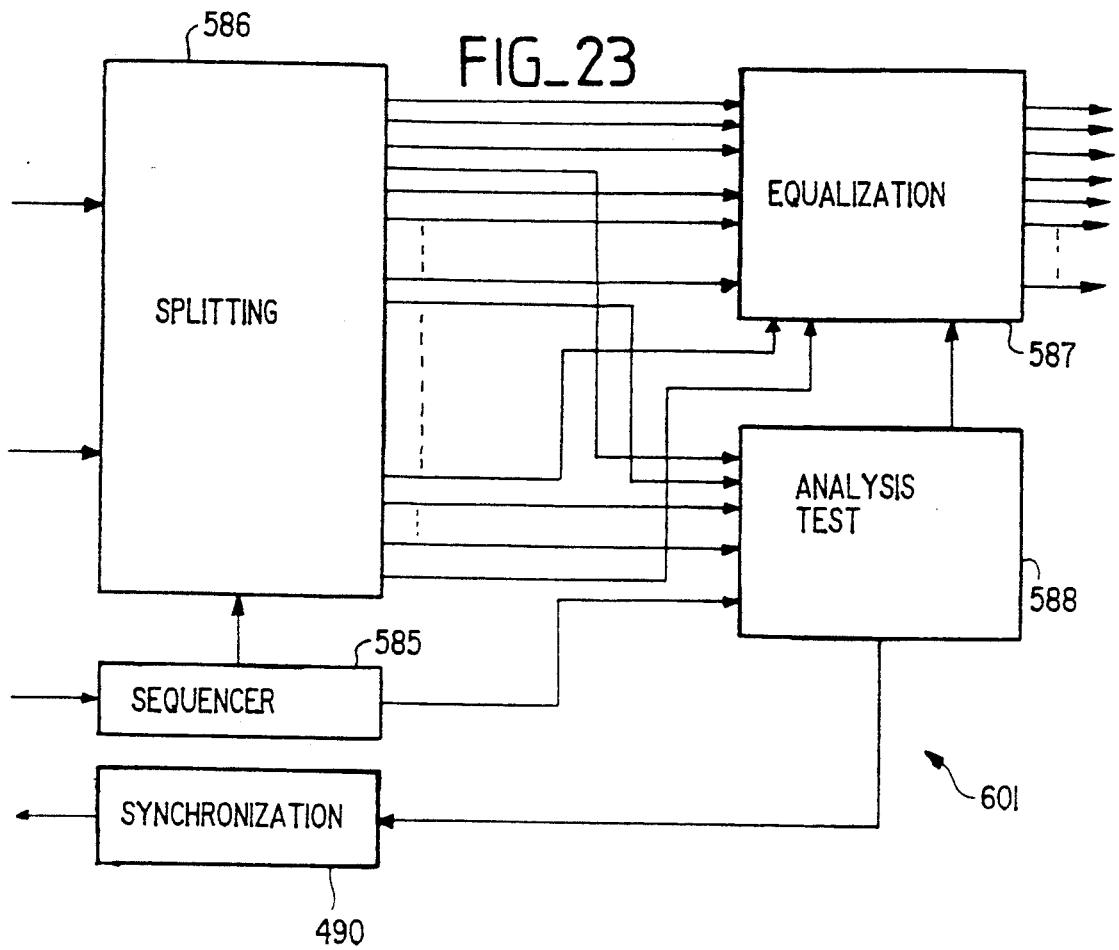
FIG_23
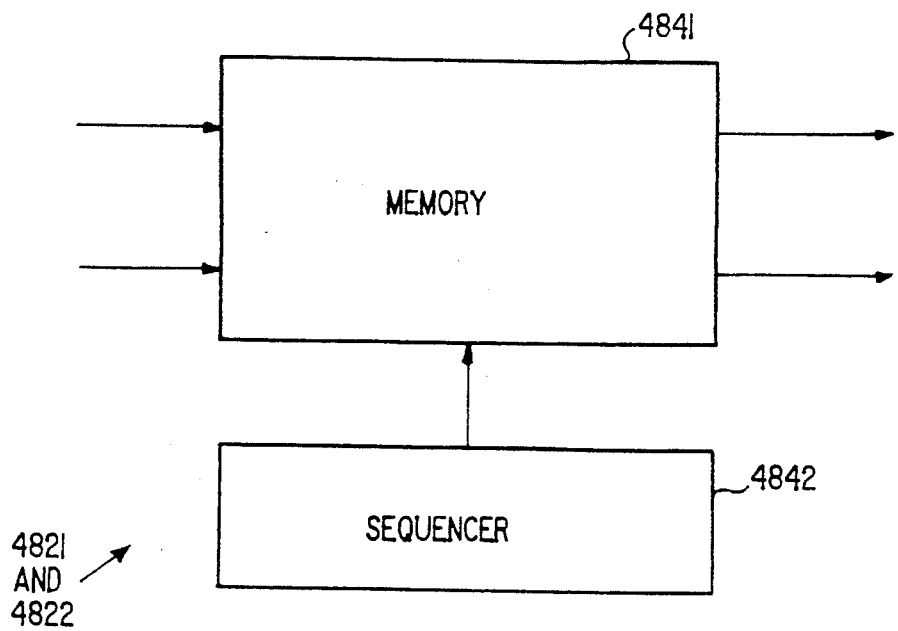
FIG_24

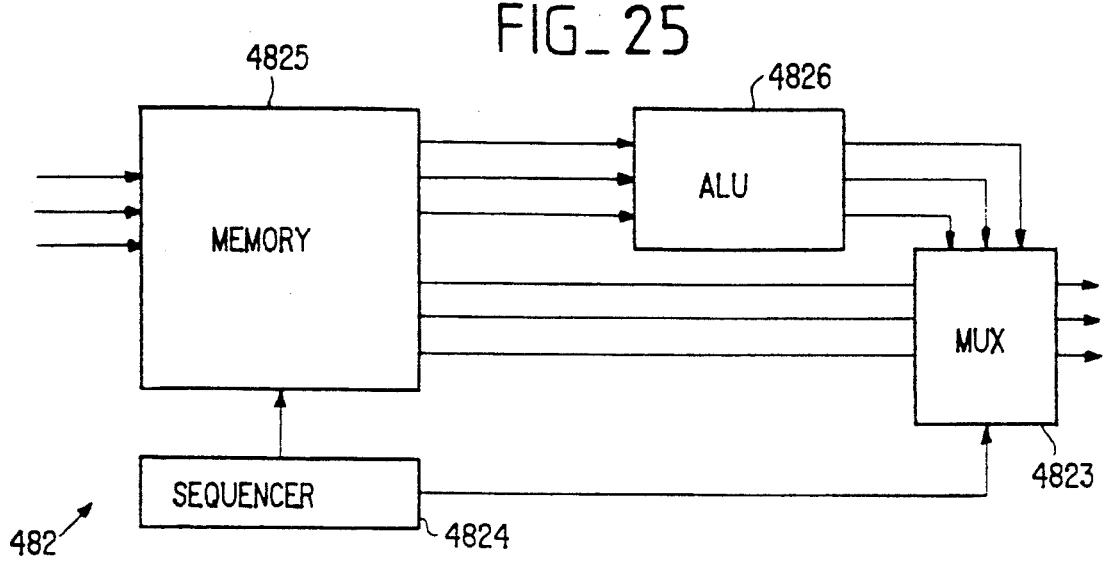
FIG_25
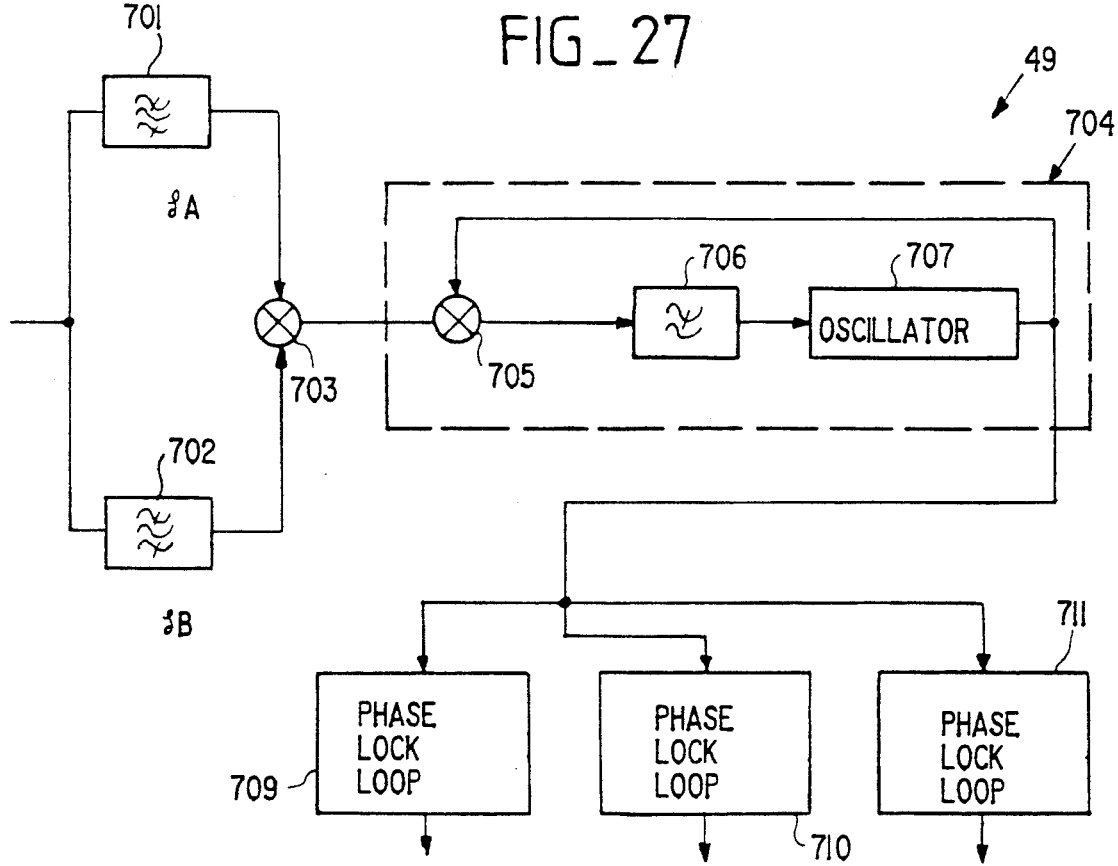
FIG_27

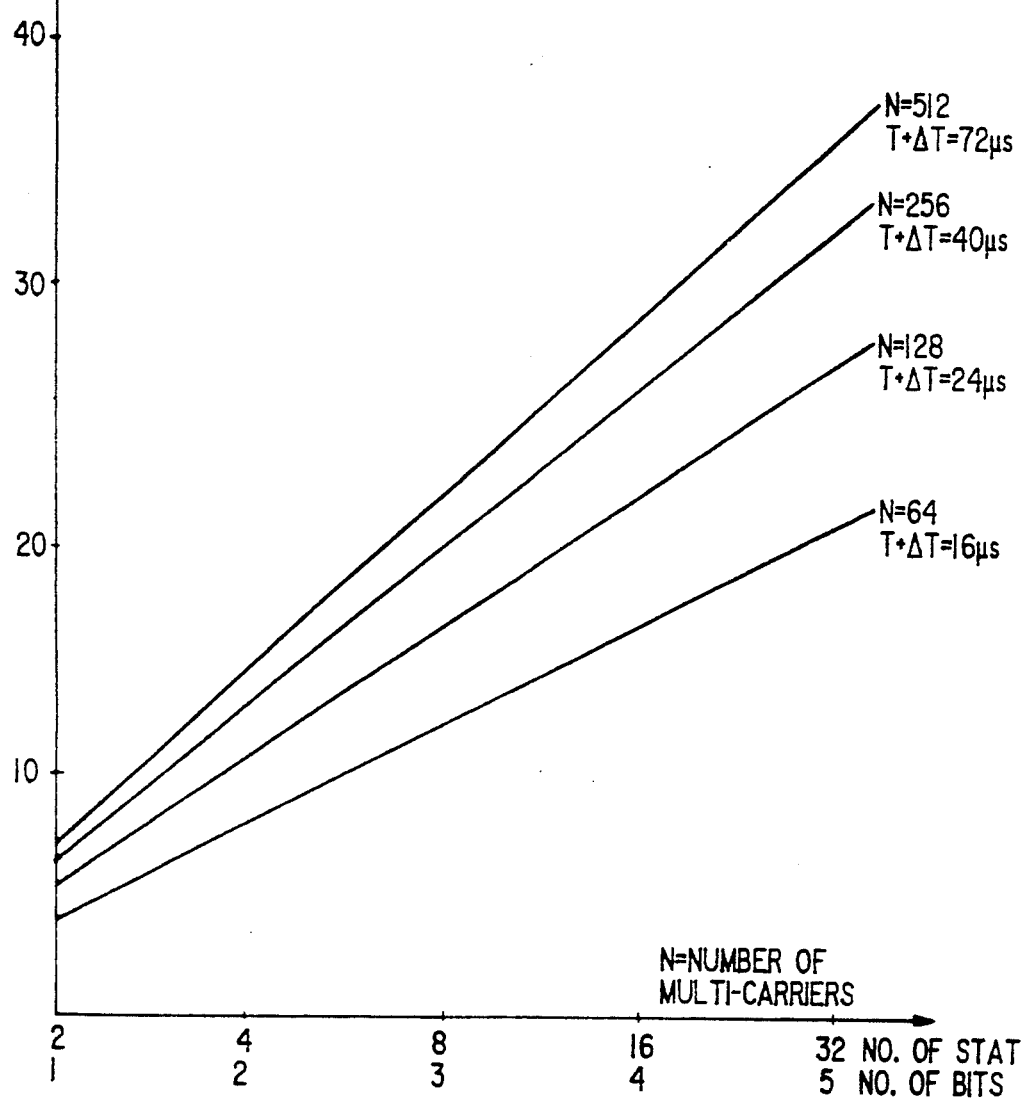
FIG_28
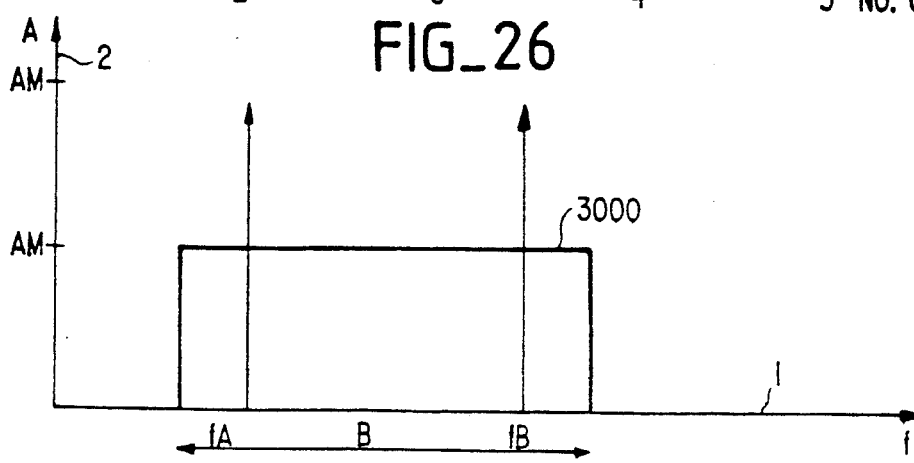
FIG_26

TRANSMITTER, TRANSMISSION METHOD AND RECEIVER

BACKGROUND OF THE INVENTION

1. Field of the Invention

The invention relates to a transmitter as well as a transmission method which are particularly high-performance. The invention also relates principally to a receiver.

2. Discussion of Background

It is known to transmit ion by using modulated waves, such as, for example, electromagnetic waves. It is known to try to increase the transmitted information throughputs. However, the increase in the throughput more often than not comes through an increase in the band of frequencies used. Now, in the case of guided transmissions there is a limitation due to the passband of the channel, for example a coaxial cable or an optical fibre, whilst in transmissions over the air there are no longer sufficient frequencies to satisfy all the needs.

Moreover, the Patent Application FR 86 09622 published under the No. 2,601,210 describes a method of transmission using symbols A (f, t). Each symbol corresponding to a frequency and a given transmission time. The transmission time not being fixed, the device does not use any means of fine synchronization, which thus limits the spectral response to approximately 0.7 bit/(Hz.s). Moreover, the French certificate of addition 86 13271 published under the No. 2,604,316 describes the use of devices for calculation of the discrete Fourier transform for the demodulation of the signal. This certificate of addition suggest moreover the use of a guard period between the symbols. However, the nonorthogonality of the channels used limits the spectral response, in the best of cases, to 1 bit/(Hz.s).

With the device according to the present invention, it is possible to exceed 5 bits/(Hz.s) under analogous conditions.

The present invention relates to an improvement in the means and of transmission methods described in the Patent 86 13937; 86 13938; 86 13939; 86 13940; 86 13941; 86 18351; 86 18352.

In the devices of known type it has often been tried to increase the information throughput by decreasing the transmission times allocated to each information unit, (or by increasing the number of possible symbols). Thus, a broadened spectrum was generated, whose secondary lobes have to be filtered on transmission, thus creating a distortion in the signal. For a square signal with a period $\tau$ a spectrum possessing numerous secondary lobes is obtained; the principle has a width of $2/\tau$. In the remainder of this specification this distortion in the signal is called auto-distortion.

SUMMARY OF THE INVENTION

The device according to the present invention offers the original feature of reducing or eliminating the auto-distortion of the signal by using long transmission intervals for the information elements (often called symbols) to be transmitted. To obtain a high throughput a plurality of information elements are simultaneously transmitted by using orthogonal channels. An information element is, for example, a digital word of 6 bits. Advantageously, one information element per transmission channel is transmitted. The orthogonality at the receiving end of the transmission channels enables the separation of the information belonging to various channels.

The orthogonalization at the receiving end of the various channels is the result of a choice of several transmission frequencies regularly spaced by k/T, k is a natural number and T the period of the useful transmission interval. This type of transmission assumes a synchronous sampling at the receiving end in order to obtain the separation of the channels.

The subject of the invention is principally a method for transmission of modulated waves simultaneously using a plurality of frequencies, characterized in that it comprises successive steps of transmission of digital words for a period $T+\Delta T$, two transmission frequencies being separated by 1/T, T being the useful transmission interval and $\Delta T$ being the transition interval.

The subject of the invention is also a method characterized in that $\Delta T > 0$.

The subject of the invention is also a method characterized in that synchronization signals are transmitted enabling, at the receiving end, the sampling of the signal for useful transmission intervals of period T so as to render orthogonal channels corresponding to the various frequencies.

The subject of the invention is also a method characterized in that T is large relative to $\Delta T$.

The subject of the invention is also a method lo characterized in that the first frequency used for is equal to k/2T, k being a positive integer or zero.

The subject of the invention is also a method characterized in that the transmission is stopped during the transition intervals.

The subject of the invention is also a method characterized in that it comprises a step:

for determination of the patterns for the useful transmission interval of period T, of transmission of the pattern for a transmission interval of period T and its coherent continuation during the transition interval of period $\Delta T$.

The subject of the invention is also a method characterized in that during each useful transmission interval of period T a digital word is transmitted on each frequency.

The subject of the invention is also a method characterized in that during each transmission interval of period T a (real part, imaginary part) or (amplitude, phase) pair is transmitted on each frequency, the (real part, imaginary part) or (amplitude, phase) pair being in one-to-one equivalence with the information to be transmitted.

The subject of the invention is further a transmitter characterized in that it enables the implementation of the method.

The subject of the invention is also a transmitter characterized in that it comprises a modulation device enabling the transmission, during a useful transmission interval of period T, of a digital word on each frequency used.

The subject of the invention is also a transmitter characterized in that the modulation device comprises N modulators, N being the number of frequencies used; the outputs of the N modulators being connected to the inputs of a summation device.

The subject of the invention is also a transmitter characterized in that the summation device comprises a symmetrical distribution tree.

The subject of the invention is also a transmitter characterized in that the modulation device comprises a device for calculation of the inverse Fourier transform.

The subject of the invention is also a transmitter characterized in that the device for calculation of the inverse Fourier transform is a digital circuit for calculation of the fast Fourier transform (FFT).

The subject of the invention is also a transmitter characterized in that one of the transmission channels is centred on the zero frequency carrier.

The subject of the invention is also a transmitter characterized in that the modulation device operates at intermediate frequency.

The subject of the invention is also a transmitter characterized in that the modulation device is a digital device for carrier modulation.

The subject of the invention is also a transmitter characterized in that it comprises means of generation, on at least some of the frequencies used, of calibration signals for the amplitude A and/or for the phase $\phi$.

The subject of the invention is also a transmitter characterized in that the said transmitter is a transmitter of digital data.

The subject of the invention is also a transmitter characterized in that the said transmitter is a television transmission transmitter.

The subject of the invention is also a transmitter characterized in that the said transmitter is a radio transmission transmitter.

The subject of the invention is also a receiver comprising means for sampling, synchronous with the signal, characterized in that it comprises means for demodulation of a modulated wave transmission using symbols transmitted for a period $T+\Delta T$ on a plurality of frequencies, two transmission frequencies being separated by $1/T$, T being the useful transmission interval and &T being the transition interval, and that it comprises a servocontrol device ensuring the synchronization of the receiver with the received signal.

The subject of the invention is also a receiver characterized in that it comprises an automatic gain control device (AGC) controlled by a device for detecting the mean power of at least part of the signal.

The subject of the invention is also a receiver characterized in that it comprises (real part, imaginary part) or (amplitude, phase) pair decoding means, in order to convert them into digital words.

The subject of the invention is also a receiver characterized in that it comprises at least one device for calculation of the fast Fourier transform (FFT).

The subject of the invention is also a receiver characterized in that it comprises a test device capable of supplying reference phases and/or amplitudes from calibration signals.

The subject of the invention is also a receiver characterized in that it comprises a device for equalization, compensating for the perturbations in the signal coming from the transmission.

The subject of the invention is also a receiver characterized in that it comprises reorthogonalization means using the transition interval of period $\Delta T$ in order to render a plurality of channels orthogonal.

The subject of the invention is also a receiver characterized in that the said receiver is a receiver of radiophonic transmissions.

The subject of the invention is also a receiver characterized in that said receiver is a receiver of television transmissions.

The subject of the invention is also a method characterized in that the modulated waves are electromagnetic waves.

The subject of the invention is also a method characterized in that the N orthogonal channel separation step comprises a step for calculation of the fast Fourier transform (FFT) of the signal.

The subject of the invention is also a method characterized in that it comprises a step for reconstruction of a television signal from signals received in the N channels.

BRIEF DESCRIPTION OF THE DRAWINGS

The invention will be better understood by means of the description hereafter and the attached figures given as nonlimit examples, in which:

FIG. 1 is a diagram illustrating the spectrum broadening phenomenon;

FIGS. 2a and 2b is a diagram illustrating the transmission of a carrier frequency;

FIG. 3 is a diagram explaining the operating principle of the device according to the present invention;

FIG. 4 is a diagram explaining the operating principle of the device according to the present invention;

FIG. 5 is a diagram explaining the operating principle of the device according to the present invention;

FIGS. 6a–6c comprises chronograms illustrating the chaining of the periods or transmission intervals;

FIG. 7 is a diagram of an example of encoding capable of being implemented in the device according to the present invention;

FIG. 8 is a general diagram of a transmitter according to the present invention;

FIG. 9 is a diagram of a first embodiment of a transmitter according to the present invention;

FIG. 10 is a diagram of a second embodiment of a transmitter according to the present invention;

FIG. 11 is a diagram of a third embodiment of a transmitter according to the present invention;

FIG. 12 is a diagram of an embodiment of a detail of the transmitters of FIGS. 9, 10 or 11;

FIG. 13 is a diagram of an embodiment detail of the transmitters in FIG. 11;

FIG. 14 is a diagram of a first embodiment of a detail of the transmitters according to the present invention;

FIG. 15 is a diagram of a second embodiment of a detail of the transmitters according to the present invention;

FIG. 16 is a diagram of a first embodiment of a detail of the device illustrated in FIG. 13;

FIG. 17 is a diagram of a second embodiment of the device illustrated in FIG. 13;

FIG. 18 is a curve illustrating the information throughput obtained as a function of the coding state number for a period of the useful transmission interval T and a number of given channels used;

FIG. 19 is a curve illustrating an analog embodiment of the transmitter-receiver synchronization.

FIG. 20 is a diagram of a third embodiment of a detail of the transmitters according to the present invention;

FIG. 21 is a diagram of an embodiment of a receiver according to the present invention;

FIG. 22 is a diagram of an embodiment of a television receiver according to the present invention;

FIG. 23 is a diagram illustrating an example of equalization capable of being implemented in the device according to the present invention;

FIG. 24 is a diagram of an architecture capable of being implemented in the device according to the present invention;

FIG. 25 is a diagram of an embodiment of a detail of the receiver according to the present invention;

FIG. 26 is a curve illustrating an analog embodiment of the transmitter-receiver synchronization;

FIG. 27 is an embodiment of a device capable of being implemented in the device according to the present invention;

FIG. 28 a curve illustrating the information throughput obtained as a function of the coding state number for a period of the useful transmission interval T and the number of given channels used.

DETAILED DESCRIPTION OF THE PREFERRED EMBODIMENT

In FIG. 1 can be seen a curve 3 representing, at the receiving end, the amplitude A 2 of the spectrum of a constant amplitude wave transmitted for a limited interval of time of period T. The curve 3 has the form of sin x/x.

In frequency, besides a principal lobe, secondary lobes are transmitted which continue to diminish in step with the distancing from the central frequency $f_0$. The amplitude A passes through zero at two points, referenced 50 and 51, symmetrical relative to the frequency $f_0$. The passages through the zero amplitude are regularly distributed, separated by 1/T.

The broadening of the spectrum depends principally on the period of the transmitted pulses. The short transmissions cause a greater frequency broadening. In the devices of known type, the broadening of the spectrum with a limited passband allocated to the transmissions, prolongs the period of the pulsed response of the signal, thus creating interferences between the pulses (called "intersymbol interferences"). The quantity of separable information was thus limited.

In FIG. 2a can be seen a curve 6 corresponding to the transmission of a pure sinusoidal frequency starting from an instant 16. The signal 6 can, for example, correspond to a carrier. The curve 6 shows the amplitude ks a function of time.

In FIG. 2b can be seen a curve 7 showing the amplitude, as a function of time, of the wave 6 received by a receiver. Insofar as the receiver is fixed relative to the transmitter, the received wave 7 has the same frequency as the transmitted wave 6. However, the amplitude and the phase have changed. In FIG. 2b, the start of the reception carries the reference 17. The instant 17 is later than the instant 16, the difference corresponding to the propagation time of the waves between the transmitter and the receiver. Starting from an instant 18, the signal 7 has the same shape as the signal 6. Between the instant 17 and the instant 18 we witness the establishment of the signal during which various perturbations are observed. The perturbations in the time interval between the instant 17 and the instant 18 are principally the result of distortions brought about by the transmission and receiving equipment, perturbations due to multiple echoes, as well as to the limitation of the passband of the transmitter. Insofar as the frequency of the signal 6 and of the signal 7 is conserved, it is possible, by carrying out a calibration of the amplitude and of the phase, to regain, at the receiving end, the information transmitted. Certain frequency modifications, as for example the frequency modification due to the Doppler effect owing, for example, to the displacement of the receiver relative to the transmitter, will be able to be compensated by a suitable calibration.

In order to carry out the calibration it is considered, for example, that everything that occurs between the transmitter and the receiver is a filter having a stable frequency response over periods much larger than the period T of the symbols. By transmitting signals of known type, it is possible to determine the frequency response of the filter. Thus, by applying the inverse frequency response the regeneration, at the receiving end, of the transmitted signal is accomplished.

In FIG. 3 can be seen a diagram illustrating the operating principle of the device according to the present invention. In FIG. 3 can be seen a first curve 31 and a second curve 32 which are centred on frequencies $f_0$ and $f_0 + 1/T$ respectively, T being the period of a useful transmission interval. The amplitude A of the curve 31 passes through zero at the points 51 and 53.

The amplitude A of the curve 32 passes through zero at the points 52, 54.

The point 52 corresponds to the maximum amplitude of the curve 31 and to the zero amplitude of the curve 32. A point 311 of the spectrum at the frequency $f_0$ is not perturbed by the signal corresponding to the curve 32.

In the same way, the point 53 corresponds to the maximum amplitude of the curve 32 and to the zero amplitude of the curve 31. At the point 53, at the frequency $f_0 + 1/T$ the signal belongs solely to the curve 32. By sampling the spectrum at the frequencies $f_0$ and $f_0 + 1/T$ the complete separation of the frequencies corresponding to the curves 31 and 32 is accomplished. It will readily be possible to use independent amplitude, phase or amplitude/phase states on each of the frequencies $f_0$ and $f_0 + 1/T$. The two codings being perfectly independent and separable at the receiving end, it is possible to distribute the total information throughput between several channels.

In the devices of known type, in order to increase the transmitted information throughput the period of the pulses and/or the time reserved for the transmission of each elementary item of information was decreased (or by increasing the number of possible symbols).

In contrast, in the device according to the present invention for a given information throughput, insofar as it is possible to distribute the throughput to be transmitted between several channels, it can be allowable to increase the period T of the pulses and/or of the useful transmission intervals corresponding to an elementary item of information. The total throughput being obtained by effecting the sum of the elementary throughputs corresponding to each frequency. By increasing the period T of the useful transmission intervals the broadening of the spectrum and the auto-distortion of the signal are decreased. It it thus possible, as illustrated in FIG. 4, to use a large number of carriers 31 to 3N. The use of N frequencies 31, 3N enables a very extensive filling of the passband B. As in the case of FIG. 3, successive curves are separated in frequency, by 1/T. Thus, the maximum in the spectrum of each channel corresponds to the passage through the zero amplitude of the spectra of all the other channels.

In FIG. 4, a curve 3i passes through the maximum at a frequency corresponding to the point 5 (i+1) and through the zero amplitude at the frequencies corresponding to the points 5j j≠i+1. For clarity in the FIG. 4, only the secondary lobes of the curve 31 have been shown.

Each transmission channel corresponding to a different carrier frequency transports an item of information independent from the other channels. The total throughput is equal to the sum of the throughputs of N channels.

The increasing of the number of channels increases the period T of the useful transmission intervals, without decreasing the throughput.

In contrast, the increasing of the number of channels necessitates, at the transmission and at the reception ends, larger or higher-performance hardware.

For a correct operation of the device according to the present invention, it is imperative that the useful part of the signal, at the receiving end, be stable. To achieve this, at the receiving end, the time intervals of period $\Delta T$, during which the signal risks not being stationary, are eliminated. This time corresponds principally to the pulsed responses of the transmitter and of the receiver and to the multiple paths. In the remainder of this Patent, the interval during which the signal risks not being stationary is called transition interval of period $\Delta T$, the stationary part of the signal exploited by the receiver, useful interval of period T. The signal is advantageously transmitted for transmission intervals of period $T + \Delta T$. Thus, the spectra of each channel although uniformly distributed with spacing of $1/T$, have a width of the principal lobe equal to $2/(T + \Delta T)$. At the receiving end, only the useful interval of period T is used, which thus enables reconstruction of the spectrum of FIG. 4. A nonlimiting example of throughput in M bits/s is shown in FIG. 18 as a function of the number of possible states (that is to say of different symbols capable of being transmitted).

Furthermore, the number of bits of the coding has been indicated as abscissa. For example, a coding on 4 bits gives $2^4 = 16$ different states. The curves are given for an identical transition interval of period $\Delta T = 8$ $\mu$s.

A first curve indicates the throughputs obtained for $N = 64$ and $T + \Delta T$ 16 $\mu$s.

A second curve indicates the throughputs obtained for $N = 128$ and $T + \Delta T = 24$ $\mu$s.

A third curve indicates the throughputs obtained for $N = 256$ and $T + \Delta T = 40$ $\mu$s.

A fourth curve indicates the throughputs obtained for $N = 512$ and $T + \Delta T = 72$ $\mu$s.

For constant transition interval, the fact of increasing the useful part of the signal leads to a saturation phenomenon limiting the throughout, not shown in FIG. 18. The curves in FIG. 18 correspond to a passband B of 8 MHz.

According, in particular, to the available passband, the application and the propagation conditions, those skilled in the art will choose the ideal compromise between the number of channels N and the useful transmission interval T.

The throughput can be increased up to a certain limit, by using a transition interval of very small period $\Delta T$ relative to the period T of the useful transmission interval.

It is advantageous to use the inverse fast Fourier transform (FFT$^{-1}$) to carry out the modulation of the channels at the transmitting end and the fast Fourier transform (FFT) to carry out the demodulation at the receiving end. The use of fast Fourier transform algorithm imposes the carrying out of the calculations on a number of samples equal to a power of two. In the course of television transmissions 256, 512, 1024 or 2048 channels are, for example, used. However, it is not necessary for each channel to transmit an item of information.

At the receiving end, for each useful transmission interval T the phase and the amplitude corresponding to each of the frequencies 31 to 3N is measured advantageously. A synchronous sampling is used to extract the item of information from the signal.

The amplitude representing the item of information is constant over all the period of the transmission interval of period T or $T + \Delta T$ and the phase representing the item of information corresponds to the phase shifting relative to a phase reference.

A receiver dedicated to the reception of the waves transmitted by the transmitter according to the present invention is described in a French Patent Application filed by the Applicant simultaneously with the present Patent Application and bearing the immediately higher number.

In order to obtain a large information throughput it is necessary to be able to distinguish close phases and amplitudes and hence to make use of a phase and amplitude reference for each channel. This reference for the amplitude and for the phase is advantageously given by reference signals periodically transmitted by the transmitter towards the receiver. The frequency of repetition of the reference signals depends on the stability of the propagation conditions and the local oscillators.

In a first variant of the device according to the present invention, phase and amplitude reference signals are periodically transmitted on all the frequencies 31 to 3N of a time interval of period T or $T + \Delta T$. However, it is necessary to note that the frequent transmission of calibration signals reduces the throughput of useful transmitted information.

In an advantageous variant of the device according to the present invention only a few calibration signals are transmitted regularly distributed advantageously over the frequencies 31 to 3 N, the coefficients of the other frequencies being determined by calculation, for example by interpolation.

More generally, it is possible to distribute the calibration signals in time and/or on different channels.

It is for example possible to periodically transmit test signals, each transmission being made on different channels. For example, a circular permutation of the channels assigned to the tests is carried out. The pulsed response of the transmission medium is deduced for all the channels, for example, by interpolation in time and/or on the frequencies. The matrix of the corrections in amplitude and in phase to be applied to each channel is thus deduced.

It is paramount to compensate, by calibrations, the variations in the pulsed response of the transmission medium, for example owing to a variation (even local) in the atmospheric conditions.

The pulsed response of the medium is determined, for example, by calculating the Fourier transform of the corrections to be applied.

In one embodiment a channel at the 8 level served in the calibration of the amplitude A and of the phase of all the channels 31 to 3N. In such a type of device it is possible, either to carry out the calibration at each useful transmission interval of period T, or as in the case of a previously described embodiment, to solely reserve certain transmission intervals for the calibration. The synchronization is maintained by the use of a stable time base.

The number of channels and/or of periods reserved for the calibration depends on the error that it is wished to be able to correct, as well as on the perturbations which are capable of affecting the information transmission. The calibrations will, for example, have to be more frequent, to compensate the displacement of the frequencies by Doppler effect in the case of displacements of one transmitter relative to the other, for example, in the case of radiotelephones or of communications between aircraft.

The first and the last channels risk being perturbed, in particular, by the filters of the transmitter and of the receiver. Advantageously as illustrated in FIG. 5, the first and the last channel are not used for the information transmission. For example, nothing is transmitted on the first and the last channel or the transmission of the second channel is repeated on the first and of the penultimate on the last.

In FIG. 6 can be seen various examples of chronograms for chaining the successive transmission periods 8.

In FIG. 6a can be seen useful transmission intervals 8. Between the useful transmission intervals 8 there are transition intervals 81 not offering any decrease in transmitted power. For example, the signal transmitted at the end of the corresponding useful transmission interval is transmitted in the transition intervals 81. The fact that the transmission power is not decreased enables the best use of the amplifiers of the transmitters.

In FIG. 6b can be seen successive useful transmission intervals 8 which are not separated by transition intervals. This case corresponds to the maximum information throughput. It has the disadvantage of the low security of transmission in the event of perturbations. This variant will for example be used for the cable transmissions.

In FIG. 6c can be seen a succession of useful transmission intervals 8 separated by transition intervals 81 during which the transmission of modulated waves is stopped. There is thus a saving in energy.

The choice of the type and of the period of transmission intervals 81 depends on the hardware used and on the hoped-for transmission and receiving conditions. For example, if large multiple echoes are expected, the use of longer transition intervals will be well advised. The length of the transition interval 81 will for example be determined from worse conditions in which it is desired to be certain of obtaining a correct reception. For example, if it is desired to be able to be free from multiple echoes coming from a maximum distance of 600 meters, a transition interval 81 will be used corresponding to the propagation time of this echo, for example electromagnetic, and possibly of the time corresponding to the damping of the pulsed response of this echo, for example 4 $\mu$s.

In FIG. 7 can be seen an example of information coding capable of being implemented in a device according to the present invention. This type of coding has been described in the Patent Applications FR 86 13937; FR 86 13938; FR 86 13939; FR 86 13940; FR 86 13941; FR 86 18351; FR 86 18352. In this type of coding an amplitude and a phase in the complex plane is associated with each digital word. The (amplitude, phase) pair is equivalent to the real and imaginary part of the signal. In the example illustrated the (amplitude, phase) pairs 14 are regularly distributed on the concentric circles 150, 160, 170 and 180. In the example illustrated in FIG. 7 use is made of 32 different values, which corresponds to a coding on five bits. It must be understood that the coding on a different number of bits, as for example 2, 3, 4 or 6 or more, does not depart from the scope of the present invention. The size of the discs 13 centred on the points 13 corresponding to the same digital word, enables the toleration of a certain inaccuracy. The greater is the diameter of the discs 13 and the lower will be the rate of errors, but the less will it be possible to have different values. In the example illustrated in FIG. 7, the circles 150, 160, 170 and 180 have diameters $\rho 1$, $\rho 2$, $\rho 3$ and $\rho 4$ respectively equal to $\sqrt{2}/2$, 1, $\rho 2$ and 2, the power of a transmitter being normalized to 1. In the example of FIG. 7, in order to decrease the risks of errors at the receiving end, the discs 13 are spread to the maximum. Thus, on each subsequent circle, the points 14 are placed on the bisector of points 14 of the previous circle. It must be understood that the arrangement in FIG. 7 is given only by way of nonlimiting example. For example, the distribution of the points 14 on a rectangle or a spiral, for example logarithmic or Archimedian does not depart from the scope of the present invention. In the same way any other type of coding can be used, the type of coding depends on the throughput and on the nature of the item of information to be transmitted. The coding can be analog or digital according to the desired application.

In the device according to the present invention, it is possible to carry out the analysis of the pulsed response of the transmission medium. According to the application it is possible to use a real time analysis or a deferred analysis.

The analysis enables adaptation of the transmission standard to the local conditions, for example in a local computer or telephone network or in directional radio links.

For example, on a local network it is possible to carry out the analysis at each reconfiguration of the network. In order to eliminate the reflections in the cables parts of the transition interval (of total period $\Delta T$) can be placed at the moment when these reflections are greatest.

In directional radio links a computer is for example used to carry out the real time analysis of the pulsed response of the medium and to adapt the transmissions in such a way as to obtain the maximum throughput permitted by the perturbations of the medium. For example, the computer decreases the period $\Delta T$ of the transition interval when this is possible without exceeding the accepted error rate. In one variant, the computer carries out the choice of a means of transmission from amongst a plurality of available ones.

In FIG. 8 can be seen a general diagram of an embodiment of a transmitter according to the present invention. The transmitter comprises a coding device 70 and a modulation device 90.

The coding device 70 receives information to be transmitted from information sources 73. The information sources can be, for example, a television camera, a microphone, a video recorder, a tape recorder, a television control room, a computer, a telephone exchange, a data acquisition device, a radiotelephone, a telephone, an information source associated with a radar, a sonar and/or a sensor. Advantageously, the transmitter according to the present invention comprises, between the information sources 73 and the coding device 70, a device 700 for information processing enabling the desired modifications to be carried out. For example, the information processing device comprises a device of known type for information throughput reduction, for example by elimination of redundant information. Advantageously, the device 700 comprises a device for scrambling the signal of known type which supplies a signal comprising the item of information to be transmitted, but whose integration in time corresponds to a white noise. Insofar as, on the one hand, the device according to the present invention enables the transmission of large information throughputs, and on the other hand, it is possible to transmit, either simultaneously, or by time-division multiplexing, different types of information, it is possible to simultaneously connect several sources 73 to the coding device 70. The coding device 70 carries out the coding either to obtain the highest performance or to conform to an established transmission standard. The item of processed information is transmitted from the coding device 70 to the modulation device 90. The modulation device 90 enables the simultaneous modulation of a plurality of carriers as illustrated, for example, in FIG. 4. The signals modulated by the modulation device 90 are amplified by an amplifier 77, transmitted, for example by an aerial 40, or injected into a cable 400. If it proves to be necessary, the modulation of a high frequency carrier is carried out before the transmission.

Insofar as N independent channels are transmitted, it is possible to carry out the separate amplification of various channels.

In FIG. 9 can be seen an embodiment of transmitters according to the present invention comprising a plurality of amplifiers 77 positioned between the modulation device 90 and the summation device 76. Advantageously, each amplifier 77 corresponds to one channel. However, it is possible without departing from the scope of the present invention, to assign several amplifiers 77 to each channel or, on the contrary to carry out a partial summation of several channels on output from the modulation device 90 in order to apply them to a single amplifier.

The use of a plurality of amplifiers 77 is particularly suited to transistorized amplifiers. In fact, it is known to use the sum of the powers supplied by a plurality of transistorized modules in order to obtain the desired power.

In FIG. 10 can be seen a first embodiment of the transmitter according to the present invention. In the example illustrated in FIG. 10 the signal to be transmitted is supplied by a television camera 71, a microphone 72 and/or other sources 73. Advantageously, the sources 71, 72 and/or 73 are connected to the information processing device 700. The coding device 70 comprises a shaping circuit connected to a device for complex digital/signals conversion. The modulation device 90 comprises a set of N modulators, referenced 91 to 9N, connected to a summation device 76. The device for summation of the signal 76 comprises, for example, a symmetrical distribution tree 760. The modulation device 90 is connected to an amplification device 77 itself connected to a transmission aerial 40 and/or a transporting cable 400. The amplification device 77 can comprise frequency elevation devices necessary to satisfy the transmission standards.

The shaping device 74 produces the desired shape of the signals coming from the sources 71 to 73. For example, the shaping device 74 carries out the multiplexing of the various sources and supplies numbers in series. The shaping circuit 74 comprises sampling circuits, analog-to-digital converter circuits, and/or multiplexors. In the case of digital devices, the calculating power of the shaping device 74 depends principally on the desired information throughput. For example, a high definition digital television transmission with high fidelity stereophonic sound in several languages as well as digital information will demand a much greater throughput than, for example, a stereophonic radiophonic transmission, or all the more so, a radiotelephone transmission.

Advantageously, (amplitude, phase) pairs, for example like those illustrated in FIG. 7, or (real part, imaginary part) pairs from the signal are transmitted. The device for digital conversion complex signals 75 generates, from digital words supplied by the shaping device 74, (real part, imaginary part) or (amplitude, phase) pairs from the signal and distributes them between the various modulators 91 to 9N. The summation device 76 supplies, to the input of the amplification device 77, a composite signal comprising the frequencies 31 to 3N necessary for the transmission. The frequencies 31 to 3N are modulation frequencies. Thus, it is possible, either at the modulation device 90 level or at the amplification device 70 level to raise the transmission frequency. The composite signal carried on a, for example, high frequency carrier is transmitted by the aerial 40 or is injected into the cable 400.

In FIG. 11 can be seen a second embodiment of the transmitter according to the present invention. The device in FIG. 11 comprises, between the output of the conversion device 75 and the input of the amplifier 77, a device for rearrangement of the signal 78, a device for calculation of the inverse Fourier transform 190, a device for serialization of the signal 301 and a device for carrier signal generation 302 which are connected in series. The modulation of the composite signal to be transmitted can be obtained by calculating an inverse Fourier transform.

Advantageously, a computer 190 capable of calculating a discrete inverse Fourier transform is used.

Advantageously, an inverse fast Fourier transform $(FFT^{-1})$ calculation circuit is used. The use of inverse fast Fourier transform algorithms implies that the number N of channels be a power of 2. However, it is not necessary that all the channels carry information.

Demonstration of the possibility of using discrete inverse Fourier transform algorithms to carry out the modulation of the signal:

Let N frequencies $f_0, f_0+1/T, f_0+2/T, f_0+3/T, \ldots, f_0+k/T, \ldots, f_0+(N-1)/T$ be amplitude and/or phase modulated for a time interval of period T. The N modulated carriers are:

$$Sk(t) = Ak \exp(j(2\pi(f_0+k/T)t+\phi k))$$

k being an integer lying between 0 and $N-1$
Ak being the amplitude of the order k carrier,
t being the time
$\phi$ k being the phase of the order k carrier.

Assuming that the reference in the transmitted phase value is taken at the start of the time intervals T.

The signals Sk (t) and Sk' (t) are independent and completely separable if they fulfil the orthogonality condition:

$$\forall k \neq k' \int_0^T Sk(t)Sk'(t)dt = 0.$$

$$\int_0^T Sk(t)Sk'(t)dt = \int_0^T AkAk' \exp j(2\pi(f_0 + k/T)t + \phi k)$$

-continued
$$\exp j(2\pi(f_0 + k'/T)t + \phi k')dt$$

$$= AkAk' \int_0^T \exp j (2\pi(f_0 + (k + k')/T)t + \phi k + \phi k')dt$$

$$= AkAk' (\exp j(4\pi f_0 T + \phi k + \phi k') - \exp j(\phi k + \phi k')$$

The orthogonality condition is therefore satisfied if $4\pi f_0 T = 2I\pi$, I being an integer, which is equivalent to $$f_0 = I/2T.$$

Taking a frequency $f_0 - (N/2-1)/T = (2L-N)/2T$.
Sampling the signals Sk (t) at the sampling frequency $f_0 = N/T = B$, B being the passband.

$$Sk(n) = Ak \exp j(2\pi((2 - N)/2T + k/T)nT/N + \phi k)$$
$$= Ak \exp j(2\pi(n(2 - N)/2N + nk/N) + \phi k)$$

The modulated signal X can be written $$X(n) = \sum_{k=0}^{N-1} Sk(n)$$
$$= \sum_{k=0}^{N-1} Ak \exp j(2\pi(n(2 - N)/2N + nk/N) + \phi k)$$
$$= \sum_{k=0}^{N/2-1} Ak \exp j(2\pi(n(2 - N) + 2k)/2N + \phi k) + \sum_{k=\frac{N}{2}-1}^{N-1} Ak \exp j(2\pi(n(2 - N + 2k)/2N) + \phi k)$$

Setting $k' = k + (N/2) + 1$ for k lying between 0 and $(N/2)-2$, that is to say that k' lies between $(N/2)+1$ and $N-1$, and $k' = k - (N/2) + 1$ for k lying between $N/2-1$ and $N-1$ which corresponds to k' lying between 0 and N/2.

$$X(n) = \sum_{k'=\frac{N}{2}+1}^{N-1} (Ak' - (N/2) - 1)\exp j (2\pi n (2 - N + 2k' - N - 2)/2N + \phi k' - N/2 - 1) + \sum_{k'=0}^{N/2} (Ak' + (N/2) - 1)\exp j (2\pi n(2 - N + 2k' + N - 2)/2N + \phi k' + (N/2) - 1)$$

$$X(n) = \sum_{k'=\frac{N}{2}+1}^{N-1} (Ak' - (N/2) - 1)\exp j (2\pi(n(k' - N)/N) + \phi k' - (N/2) - 1) + \sum_{k'=0}^{N/2} (Ak' + (N/2) - 1)\exp j(2\pi(nk'/N) + \phi k' + (N/2) - 1)$$

$$X(n) \sum_{k'=0}^{N-1} Bk'\exp(j\theta k')\exp j(2\pi nk'/N)$$

with $$Bk' = Ak' + (N/2) - 1$$
$$\theta k' = \theta k' + (N/2) - 1 \text{ for } k' = 0, \ldots, N/2$$

$$Bk' = Ak' - (N/2) - 1 \text{ for } k' = N/2 + 1, \ldots, N - 1$$
$$\theta k' = \phi k' - (N/2) - 1$$

{X (n))} is the discrete inverse Fourier transform {(DFT$^{-1}$) of A((N/2)-1) exp (j $\phi$ (N/2)-1), ..., AN-1 exp (j $\phi$ (N-1)), ..., Ao exp (j $\phi$ 0), ..., A ((N/2)-2) exp (j $\phi$ (N/2)-2)

Similarly, at the receiving end, it is possible to carry out the demodulation of the signal by carrying out a discrete Fourier transform (DFT).

The invention is not limited to the use of the inverse Fourier transform to carry out the modulation of the signal. Other algorithms transforming a frequency domain into the time domain can be implemented.

The serialization device 301 supplies, advantageously, a succession of digital values to the device for generation of the signal 302. Advantageously, the serialization 301 repeats certain digital values in such a way as to generate the transition interval. Advantageously, during the transition intervals of period T the end of the useful interval of period T following the said transition interval is retransmitted.

In a variant corresponding to the signals illustrated in FIG. 6c, the serialization device 301 supplies "O"s during the period $\Delta T$ of the transition intervals.

The serialization device comprises means of storage and multiplexors.

It must be understood that other variants of generation of the signal like, for example the generation of homodyne signal using for example a plurality of devices for calculation of the Fourier transform does not depart from the scope of the present invention.

In FIG. 12 can be seen an embodiment of the device 75 for conversion of digital words into complex signals. The device 75 comprises two conversion tables 750 stored in devices with permanent memory capability. For example, permanent memories of read-only memory, programmable read-only memory, erasable programmable read-only memory, electrically erasable programmable read-only memory or safeguarded random-access memory (ROM, PROM, EPROM, EEPROM or RAM) type are used. The digital words to be converted correspond to the addresses in the tables 750, the value of the amplitude or the real part of the signal being stored at this address in a first table 750, the value of the phase or the imaginary part of the signal being stored in the second table.

It must be understood that the two tables do not necessarily correspond to two memory boxes. Thus, it is possible to use a single memory box having a sufficient capacity, or to use more than two memory boxes, depending c n the desired resolution and the capacity of the memory circuits used.

In FIG. 13 can be seen a rearrangement device 78. The rearrangement device 78 comprises a device with memory capability 781, a multiplexor 782 and a sequencer 784. The device with memory capability 781 is connected to the multiplexor 782. The sequencer 784 is connected, via a control line 785, to the device with memory capability 781 and via a control line 786, to the multiplexor 782. The rearrangement device 78 enables the putting of the data to be processed into a format compatible with the calculating device 190. The rearrangement of the data depends, in particular, on the model, for example, for the circuits used for calculation of the fast Fourier transform. The sequencer 784 enables rearrangement of the order of digital words and/or bits inside digital words to be processed by the calculation circuit, not shown in FIG. 13. The sequencer 784 supplies the addresses to the device with memory capability 781 by way of the line 785 as well as control signals. The sequencer 784 supplies the control signals to the multiplexor 782 by way of the line 786 enabling the switching between various positions of the multiplexor. The multiplexor 782 is, for example, a three-position multiplexor enabling the choosing between two memory banks and a zero generator 787. The zero generator 787 for example enables generation of zeros necessary for the generation of the signal by the inverse Fourier transform.

The zeros necessary for the generation of the inverse Fourier transform are stored in a device with memory capability 781. They are transmitted, either from special connections of the device with memory capability 781 which is connected to the multiplexor 782, or by the addressing executed by the sequencer 784 of the device with memory capability 781.

If necessary the device 78 comprises an interface 783 enabling the adaptation of the output signals to the input signals of the circuit for calculation, for example, of the discrete Fourier transform.

In FIG. 16 can be seen an embodiment of the device with memory capability 781 of FIG. 13. In the example illustrated in FIG. 16 the device with memory capability 781 comprises four memory banks 7811, 7812, 7813 and 7814. Each bank receives, for example, from the sequencer 784 a read or write command R/W. Two banks, for example 7811 and 7812, are in read mode and two banks, for example 7813 and 7814, are in write phase simultaneously. Thus, the signals arriving are capable of being written into a bank in the order which will be necessary for their re-reading. The simultaneous re-reading of the second memory bank enables the supplying of the necessary digital data to the calculation circuit.

In FIG. 17 can be seen a second embodiment of the device with memory capability 781. The device with memory capability 781 in FIG. 17 comprises only two memory banks 7811 and 7812. The sequencer 784 is, in this case, a direct memory access (DMA) sequencer. Thus, the two memory banks enable the simultaneous reading and writing of the data.

In the case of FIGS. 16 and 17 real and imaginary component I and Q phase quadrature data are simultaneously supplied.

In the device according to the present invention, it is possible to use the modulation of the signal on various frequencies. For example, in the case of high frequency electromagnetic wave usage it is possible to modulate the signal directly on the transmission carrier, that is to say at the transmission frequency, as illustrated in FIG. 15, to carry out the modulation on intermediate frequencies as illustrated in FIG. 14 or to carry out the modulation on the base frequency.

The modulation on the baseband is necessarily carried out in terms of I and Q. By contrast, at intermediate frequency or on the transmission carrier the modulation can be carried out from real signals as illustrated in FIG. 20.

The device of FIG. 20 comprises an analog-to-digital converter 3211, a low-pass filter 3209, a mixer 3201, a filter 3022, a mixer 3204 and a filter 3205 which are connected in series. The second inputs of the mixers 3201 and 3204 are connected to local oscillators which are not shown in the figure.

In FIG. 14 can be seen a second embodiment of a device 302 for generation of the signal to be transmitted.

The device 302 comprises a first mixer 3201 and a second mixer 3207 which are connected to a summation device 3023. The output of the summation device 3023 is connected to a first input of a third mixer 3204.

The second input of the mixer 3207 is connected to the output of a local oscillator 3305 generating the intermediate frequency. The second input of the mixer 3201 is connected to the output of the local oscillator 3305 by way of a device 3208 inducing a phase shift of $\pi/2$. Thus, the elevation in the frequencies of the phase quadrature components I and Q is carried out, the signal being reconstructed by the summation device 3023.

The second input of the mixer 3204 is connected to a local oscillator 3306 whose frequency of oscillation is higher than that of the local oscillator 3305.

Advantageously, the two oscillators 3305 and 3306 are synchronized by a single time base, not shown. The local oscillators 3305 and 3304 are sufficiently stable to allow a reliable calibration at the receiving end.

Advantageously, the time base is synchronized with the device for sampling the signal.

In a variant the device 302 is a digital device.

In the variant illustrated in FIG. 14 the device 302 is an analog device thus, it comprises, at the input end, analog-to-digital converters 3211 and 3212 The converters 3211 and 3212 are connected to the first inputs of the mixer respectively 3201, 3207. Low-pass filters respectively 3209, 3210 are placed between the output of the analog-to-digital converters 3211 and 3212 and the inputs of the mixers 3201, 3207. The filters 3209 and 3210 are intended to eliminate the high frequency components generated by the analog-to-digital converters 3211 and 3212.

At the output of the mixers 3201, 3207 and 3204 it is necessary to position filters respectively 3022, 3206 and 3205 which are intended to select the desired part of the spectrum present at the output of the mixers.

In FIG. 15 can be seen a variant of the device 302 comprising a single frequency elevation stage. The device 302 of FIG. 15 comprises a first mixer 3201 and a second mixer 3207. The outputs of the mixers 3201 and 3207 are connected to the inputs of a summation device 3203 by way of band-pass filters 3022 and 3206. In the analog example illustrated in FIG. 15 the first input of the mixers 3201 and 3207 are connected to the outputs of the analog-to-digital converters 3211 and 3212 by way of the filters 3209 and 3210.

The transmitter according to the present invention conveys coding signals enabling, at the receiving end, the precise synchronization of a time base of the receiver with a time base f the transmitter. Thus, it is possible to achieve a good temporal and/or phase resolution.

In an embodiment illustrated in FIG. 19 an analog synchronization is used.

In the example illustrated in FIG. 19 a set 3000 of modulated signals is transmitted on N channels, the spectrum is substantially rectangular having a frequency width f 1 equal to B, the passband, and a height Am corresponding to the mean amplitude A 2 of the signal inside the band B. Two frequencies $f_A$ and $f_B$ with an amplitude AM considerably greater than Am are transmitted. For example, AM is greater than Am by 12 db. Thus, at the receiving end, by knowing the frequencies $f_A$ and $f_B$ it will be possible to separate $f_A$ and $f_B$. Through the knowledge, on the one hand, of the frequencies $f_A$ and $f_B$ and, on the other hand, of their difference at the receiving end, a frequency reference is obtained from which a time reference can be extracted. At the receiving end the difference $f_A - f_B$ is obtained, for example by making the frequencies $f_A$ and $f_B$ beat in a mixer.

In an embodiment of the device according to the present invention B is equal to 8 MHz and $f_A$ is separated from $f_B$ by 5 MHz.

In FIG. 21 can be seen a diagram of an embodiment of a receiver on the present invention. The embodiment illustrated in FIG. 21 comprises a receiving aerial 40, an amplifier 603, a mixer 41, a band-pass filter 42, a variable gain amplifier 604, a mixer 4817, a low-pass filter 4818, an analogdigital converter 4819, a reorthogonalization device 482, a demodulation device 48, a local oscillator 250, an automatic gain control device 605, a local oscillator 491, a servocontrol device 49, an analysis circuit 601, a decision circuit 602, a processing device 45, and an exploitation device 46.

The aerial 40 is connected to the input of the amplifier 603. The output of the amplifier 603 is connected to a first input of the mixer 41. The output of the mixer 41 is connected to the input of the band-pass filter 42. The output of the band-pass filter 42 is connected to the input of the amplifier 604. The output of the amplifier 604 is connected on the one hand, to a first input of the mixer 4817, and on the other hand, to the input of the automatic gain control circuit 605. The output of the automatic gains control 605 is connected to a gain command input of the amplifier 604. The output of the mixer 4817 is connected to the input of the low pass filter 4818. The output of the low-pass filter 4818 is connected to the input of the analog digital converter 4819. The output of the analog digital converter 4819 is connected to the input of the reorthogonalization device 482. The output of the reorthogonalization device 482 is connected to the input of the demodulation device 48. The output of the demodulation device 48 is connected, on the one hand, to the input of the analysis circuit 601 and on the other hand, to the input of the servocontrol device 49. The output of the analysis circuit 601 is connected to the input of the decision device 602. The output of the decision device 602 is connected to the input of the information processing device 45. The output of the information processing device 45 is connected to the input of the exploitation device 46. A first output of the servocontrol device 49 is connected to the analog digital converter 4819, to the reorthogonalization device 482, to the demodulation device 48, to the analysis circuit 601 and to the decision device 602. A second output of the servocontrol device 49 is connected to the local oscillator 491. A third output of the servocontrol device 49 is connected to the local oscillator 250.

The aerial 40 receives the high frequency signal coming from the transmitter.

The amplifier 603 amplifies the signal captured by the aerial 40. By beating with a high frequency signal supplied by the local oscillator 250, the mixer 41 lowers the frequency of the received signal.

The signal is filtered by a filter 42. The filter 42 enables elimination of the signals extraneous to the signals which one wishes to be able to receive. The filter 42 is advantageously a surface acoustic wave (SAW) filter.

The amplifier 604 carries out, under the control of the automatic gain circuit 605, the amplification of the intermediate frequency signal. The automatic gain circuit captures the signal at the output of the amplifier 604. An integration over a sufficiently long period of time supplies the mean value of the amplitude of the signal for the calculation of a command signal for the amplifier 604 enabling optimization of the reception.

The mixer 4817 carries out beating between a signal supplied by the local oscillator 491 and the signals amplified by the amplifier 604. The mixer 4817 delivers a signal at the low carrier level. The filter 4818 selects the desired part of the spectrum.

The analog-to-digital converter 4819 carries out the digital sampling of the signal.

In order to be able to obtain large information throughputs, it is paramount to carry out a total separation of the signals belonging to various channels. The reorthogonalization circuit 482 advantageously enables elimination of the crosstalk between channels. The crosstalk could for example be the result of multiple echoes which delay part of the signal. Such signals arrive at the receiver, in particular, during the receiving of the subsequent pattern. The reorthogonalization device 482 comprises a pattern-modification detection circuit. For example, it comprises means for subtracting the signal from a signal delayed by a period T. While the two samples are taken in a single transmission interval of period $T + \Delta T$ their difference is almost constant. This is true for each transmission interval during a period $\Delta T$ decreased by the arrival time of the most distant multiple echo. In contrast, the rapid fluctuation in this difference indicates that the two samples no longer belong to the same transmission interval. Thus, from the difference in two samples the instant of the transmission interval modification and consequently a synchronization of the transmission intervals (also called packet synchronization) is determined. The signal coming from the multiple echoes, being in danger of provoking a crosstalk, is either eliminated in the case illustrated in FIG. 6a, or added in coherent fashion to the previous pattern in the case illustrated in FIG. 6c. In the first case, the period $\Delta T$ of the transition interval is advantageously greater than the propagation period of the multiple echoes which it is desired to be able to eliminate. The elimination of the multiple echoes is carried out, for example, by not taking account of the signals received during the transition intervals 81 of period $\Delta T$.

In the second case, the signals arriving during the transition interval are picked up and added to the start of the corresponding useful transmission interval. This latter embodiment requires delay means enabling storage of previous patterns prior to their processing by the demodulation device 48.

The demodulation device 48 carries out the separation of the signals belonging to the various channels. In the example illustrated in the figure, the processing is digital. For example, a device for calculation of the discrete Fourier transform is used. Advantageously, a device for calculation of the fast Fourier transform (FFT) is used. However, an analog separation for example by using frequency mixer banks, separated by 1/T, does not depart from the scope of the present invention.

The demodulated signals are supplied, on the one hand, to an analysis circuit 601, and on the other hand, to a servocontrol device 49.

The analysis circuit 601 carries out the analysis of the received signals, the equalization and the calibration of the signals, from calibration or test signals received from the transmitter.

The servocontrol device 49 carries out the synchronization between the various stages of the receiver and between the receiver and the transmitter. In particular, it supplies synchronization signals to the local oscillators 250 and 491 enabling their stable operation over time. Furthermore, it supplies a sampling frequency to the analog-to-digital converter 4819, to the reorthogonalization device 482, to the demodulation device 48, to the analysis circuit 601 and to the decision device 602.

The signals normalized by the analysis circuits 601 are supplied to the decision device 602.

The decision circuit 602 determines which point 14 of FIG. 7 is involved and hence which (real part of the signal, imaginary part of the signal) or (amplitude, phase) pair is involved. The decision device 602 advantageously associates a digital word with each pair.

The receiver according to the present invention comprises other devices such as for example a processing device 45. The processing device 45 carries out the desired processing on the signal. For example, in a television receiver the processing circuit 45 reconstructs the image and the sound from digital signals. Advantageously, the processing device 45 uses image decompression algorithms insofar as image compression algorithms were used at the transmission end.

The information processing device 45 is connected to the exploitation device 46. The exploitation device 46 enables exploitation of the signals received. The type of exploitation device depends principally on the type of receiver which is used. For example, for television signal transmission a cathode ray tube or a flat screen and a loud speaker will in particular be used. For the transmission of telephonic data the exploitation device is, for example, a telephone exchange or a telephone. For the transmission of data the exploitation device 46 can be, for example, a computer receiving the data to be processed or to be stored.

In FIG. 9 can be seen an embodiment of the receiver according to the present invention comprising, for the low carriers, a processing chain for the real part and a processing chain for the imaginary part of the signal in phase quadrature.

The device of FIG. 22 comprises an aerial 40, an amplifier 603, a mixer 41, band-pass filter 42, a variable gain amplifier 604, an automatic gain command circuit 605, a mixer 4817, a mixer 4814, a low-pass filter 4818, a low-pass filter 4815, an analog digital converter 4819, an analog digital converter 4816, a reorthogonalization device 4821, a reorthogonalization device 4822, a demodulation device 48 an analysis circuit 601, a decision circuit 602, an information processing device 45, a display device 462, a sound recording device 461, a servocontrol device 49 and a $\tau/2$ phase shifter 4813.

The aerial 40 is connected to the input of the amplifier 603. The output of the amplifier 603 is connected to a first input of the mixer 41. The output of the mixer 41 is connected to a band-pass filter 42. The output of the band-pass filter 42 is connected to the input of an amplifier 604. The output of the amplifier 604 is connected to the input of an automatic gain command device 605, to a first input of a mixer 4817 and to a first input of the mixer 4814. The output of the automatic gain command device 605 is connected to a first gain command input of an amplifier 604. The output of the mixer 4817 is connected to the input of the filter 4818. The output of the mixer 4814 is connected to the input of the filter 4815.

The output of the filter 4818 is connected to the input of the analog digital converter 4819. The output of the low-pass filter 4815 is connected to the input of the analog-to-digital converter 4816. The output of the analog-to-digital converter 4819 is connected to the input of the reorthogonalization device 4821. The output of the analog-to-digital converter 4816 is connected to the input of the reorthogonalization device 4822. The outputs of the reorthogonalization device 4821, 4822 are connected to the inputs of the demodulation device 48. The output of the demodulation device 48 is connected to the input of the analysis circuit 601 and of the servocontrol device 49. The output of the analysis circuit 601 is connected to the input of the decision device 602. The output of the decision device 602 is connected to the input of the information processing device 45. The output of the information processing device 45 is connected to the exploitation device such as for example, the display device 462 and sound recording device 461. A first output of the servocontrol device 49 is connected to the analog-to-digital converters 4819 and 4816, to the reorthogonalization devices 4821 and 4822, to the demodulation device 48, to the analysis circuit 601 and to the decision device 602. This output supplies the sampling frequency. In the embodiment illustrated in FIG. 22 the beat frequency is supplied directly via outputs 11 of the servocontrol device 49. A high frequency output is connected to the second input of the mixer 41. A middle frequency output is connected to the input of the $\pi/2$ phase shifter 4813 and to the second input of the mixer 4817. The output of the phase shifter 4813 is connected to the second input of the mixer 4814. In the device illustrated in FIG. 22 the real and imaginary part of the signal, in phase quadrature, is operated on. Thus it is possible to lower the frequency without losing information.

The demodulation device 48 comprises, advantageously, a device for calculation of the Fourier transform.

Advantageously, the device for calculation of the Fourier transform is a device for calculation of the discrete Fourier transform.

Advantageously, the device for calculation of the Fourier transform is a device for calculation of the fast Fourier transform (FFT). The use of fast Fourier transform algorithm necessitates the carrying out of the calculations on a number of samples equal to a power of two. In the course of television transmissions, 256, 512, 1024 or 2048 channels are for example used. However, it is not necessary that each channel transmit an item of information. The use of a device for calculation of the fast Fourier transform in order to carry out the demodulation of the received signal enables use of standard circuits or a combination of standard circuits for calculation of the fast Fourier transform. It must be understood that other variants, such as for example homodyne demodulation, do not depart from the scope of the present invention.

In FIG. 23 can be seen an embodiment of the analysis device 601. The device of FIG. 23 comprises a splitting device 586, equalization device 587, a device for analyzing test signals 588 and a sequencer 585.

The splitting device 586 receives the signals to be processed. The outputs of the splitting device 586 are connected, on the one hand, to the equalization device 587 and on the other hand, to the analysis and test device 588. The output of the analysis and test device 588 is connected, on the one hand, to the equalization device 587 and on the other hand, to the synchronization device 490.

The splitting device 586 separates the test signals which it conveys towards the analysis and test device 588, from the information signals which it conveys into the equalization device 587. The detection of the test signals can be effected, for example, according to a specified transmission standard. For example, the splitting device 586 "knows" that, in each transmission interval, a channel at the 8 level is reserved for the test signals. In another transmission standard, the test signals can correspond to all the channels of a transmission interval at the, for example, 100 level. These two types of test signals serving in the calibration of the received phase and/or amplitude can be mixed in order to give, for example, a test channel at the 16 level every 64 intervals.

In a first embodiment, the receiver according to the present invention is designed to be able to follow a single standard. In such a case it is necessary to carry out a first synchronization or indeed receive a synchronization from another device of the receiver.

In a second variant of the receiver according to the present invention the receiver can receive several transmission standards. In this case, it is necessary to detect which transition standard the received signals belong to. Insofar as the transmissions on separate channels enable the transmission by multiplexing several channels and/or via a time-division multiplexing to convey information of differing nature, it is possible to reserve, for example, part of the information throughput for service information. The service information can, for example, contain periodically the item of information concerning the type of transmission carried out.

The transmission standard can also be chosen by switching by the user choosing the desired programme. The latter chooses, for example, to pass from a television transmission to a radiophonic transmission. The information on the transmission standards is for example stored in a permament memory (not shown).

The splitting device 586 comprises, for example, multiplexors and a hardwired logic element carrying out the orders supplied by the sequencer 585.

The values of the test signals must be known to the receiver. For example, the test signals are pseudorandom signals. The signals are generated in the transmitter and the receiver according to the same algorithm, which thus enables comparison of the received signal with a signal identical with the signal which was transmitted.

The analysis and test device 588 detects the level received in each of the test channels. It determines the phase shift and the attenuation which are received in the test channels. From the attenuation and the phase shift the analysis and test device 588 determines the attenuations and the phase shifts in the channels intermediate between the test channels by using, for example, the interpolation method. The interpolation can, for example, be a linear interpolation.

In order to obtain a large information throughput it is necessary to be able to distinguish close phases and amplitudes and hence to make use of an amplitude and phase reference for each channel. This amplitude and phase reference is advantageously given by reference signals transmitted periodically by the transmitter towards the receiver. The frequency of repetition of reference signals depends on the stability of the propagation conditions and the local oscillators.

In a first variant of the device according to the present invention, phase and amplitude reference signals are periodically transmitted on all the frequencies 31 to 3N of a time interval of period T or T+ΔT. However, it is necessary to note that the frequent transmission of calibration signals reduces the throughput of useful transmitted information.

In an advantageous variant of the device according to the present invention only a few calibration signals are transmitted regularly distributed advantageously over the frequencies 31 to 3 N, the coefficients of the other frequencies being determined by calculation, for example by interpolation.

More generally, it is possible to distribute the calibration signals in time and/or on different channels.

It is for example possible to periodically transmit test signals, each transmission being made on different channels. For example, a circular permutation of the channels assigned to the tests is carried out. The pulsed response of the transmission medium is deduced for all the channels, for example, by interpolation in time and/or on the frequencies. The matrix of the corrections in amplitude and in phase to be applied to each channel is thus deduced.

It is paramount to compensate, by calibrations, the variations in the pulsed response of the transmission medium, for example owing to a variation (even local) in the atmospheric conditions.

The pulsed response of the medium is determined, for example, by calculating the Fourier transform of the corrections to be applied.

In one embodiment a channel at the 8 level served in the calibration of the amplitude A and of the phase of all the channels 31 to 3N. In such a type of device it is possible, either to carry out the calibration at each useful transmission interval of period T, or as in the case of a previously described embodiment, to solely reserve certain transmission intervals for the calibration. The synchronization is maintained by the use of a stable time base.

The analysis and test device comprises, for example, the device with memory capability and microprocessors for processing of the rapid signal. The values of phase shift and attenuations for each channel are transmitted to the equalization device 587.

The equalization device 587 applies, to each channel, an amplification and a phase shift which are inverse to those induced by the transmission. Thus, the amplitudes of all the channels at the receiving end are, after equalization by the circuit 587, proportional to the amplitudes at the time of the transmission. In the same way, the relative phase shift between channels at the receiving end is, after the processing by the equalization device 587, equal to the relative phase shift between the channels at the transmission end.

In an analog variant the equalization device 587 comprises variable phase shifters and variable amplifiers. The analog phase shifters can have a digital control, charge transfer devices (CCD) comprising a single input and a plurality of output can for example be used. Each output corresponds to a different phase shift.

In a digital variant of the equalization device 587 multiplications and additions are used to carry out amplitude and phase corrections. Hardwired logic elements and/or microprogrammed or programmed logic elements are used.

In FIG. 24 can be seen an architecture of known type capable of being implemented in the device according to the present invention. The architecture of FIG. 24 is capable of being used in the reorthogonalization device. The device with memory capability 4841 is, for example, a two-port device. The data to be stored arrive via the input port. These data, rearranged, set off again from the output port. The sequencer 4842 supplies the addresses for the inscription and rereading of the data. According to the desired type of data reorganization it is possible to reread entire words or only parts of words or individual bits. The device with memory capability 48-41 comprises, for example, random-access memory (RAM) integrated circuits.

The sequencer 4842 comprises, for example, a hardwired logic element and counters. In a variant, in order to use standard circuits, it is possible to replace the sequencer 4842, for example, by a microprocessor. Advantageously, the microprocessor is of the type processing of the signal.

In FIG. 25 can be seen a second embodiment of a reorthogonalization device. In the embodiment illustrated in FIG. 25, the device 482 comprises a device with memory capability 4825, an arithmetic and logic unit 4826, a multiplexor 4823 as well as a sequencer 4824 The output of the device with memory capability 4825 is connected to the input of the arithmetic and logic unit 4826 and to a first input of the multiplexor 4823. The output of the arithmetic and logic unit 4825 is connected to a second input of the multiplexor 4823. The sequencer 4824 receives the general signals for synchronization of the receiver, for example, from a servocontrol device 49. The sequencer 4824 sends control and synchronization signals to the multiplexor 4823. The sequencer 4824 sends address and synchronization signals to the device with memory capability 4825. In the device illustrated in FIG. 25 the addressing of the memory 4825 by the sequencer 4824 enables the carrying out of the rearrangement of the digital words. The arithmetic and logic unit is charged with carrying out the desired summations of the signals. The switching of the multiplexor 4823 enables choice between the two modes of rearrangement depending on the desired transmission standard and the receiving phase in progress.

Moreover, it is possible to use, in order to exploit the signal, to use an amplitude/phase demodulator such as that illustrated in FIG. 22 of the Patent Fr 86 139 37 filed by the Applicant on Oct. 7, 1986.

The transmitter according to the present invention conveys coding signals enabling, at the receiving end, the precise synchronization of a time base of the receiver with a time base of the transmitter. Thus, it is possible to achieve a good temporal and/or phase resolution.

In a first embodiment of the device according to the present invention, a digital synchronization is used.

In an embodiment illustrated in FIG. 27, an analog synchronization is used.

In the example illustrated in FIG. 26, a set 3000 of modulated signals is transmitted on N channels.

The spectrum is substantially rectangular having a frequency width f 1 equal to B, the passband, and a height Am corresponding to the mean amplitude A 2 of the signal. Inside the band B, two frequencies $f_A$ and $f_B$ with an-amplitude AM considerably greater than Am are transmitted. For example, AM is greater than Am by 12 db. Thus, at the receiving end, by knowing the frequencies $f_A$ and $f_B$ it will be possible to separate $f_A$ and $f_B$. Through the knowledge, on the one hand, of the frequency $f_A$ and $f_B$ and, on the other hand, of their difference at the receiving end, a reference of the frequency is obtained from which a time reference can be extracted. At the receiving end the difference $f_A - F_B$ is obtained, for example by making the frequencies $f_A$ and $f_B$ beat in a mixer.

In an embodiment of the device according to the present invention B is equal to 8 MHz and $f_A$ is separated from $f_B$ by 5 MHz.

In FIG. 14 is shown an analog embodiment of the servocontrol device 49 of FIGS. 8 and 9. The device of FIG. 14 is intended to operate with a signal transmitted by the transmitter such as illustrated in FIG. 13. The servocontrol device 49 comprises a band-pass filter 701 and a band-pass filter 702, a mixer 703, a phase lock loop 704 (PLL), a frequency division phase lock loop 709 (PLL), a frequency division phase lock loop 710 (PLL) and a frequency division phase lock loop 711 (PLL). The phase lock loops comprise, for example, a mixer, a low-pass filter, a voltage controlled oscillator. In FIG. 27, the loop 704 comprises a mixer 705, a low-pass filter 706, a voltage controlled oscillator 707 (VCO).

The input of the device 49 is connected to the inputs of the filters 701 and 702. The output of the filter 701 is connected to a first input of the mixer 703. The output of the filter 702 is connected to a second input of the mixer 703. The output of the mixer 703 is connected to a first input of the mixer 705. The output of the mixer 705 is connected to the input of the low-pass filter 706. The output of the oscillator 707 is connected to the input of the phase lock loop 709, to the input of the phase lock loop 710 to the input of the phase lock loop 711. The output of the low-pass filter 706 is connected to the input of the oscillator 707. The output of the oscillator 707 is connected to the second input of the mixer 705. The outputs of the phase lock loops 709, 710 and 711 constitutes the outputs of the servocontrol device 49 supplying the desired frequencies.

The filter 701 selects the frequency $f_A$, the filter 702 selects the frequency $f_B$. The mixer 703 carries out the beating between the frequency $f_A$ and $f_B$.

The phase lock loop 704 supplies the value of the differences between frequencies $f_A$ and $f_B$. The difference between the frequencies $f_B$, $f_a$ at the transmission end, determined by the transmission standard, is known. The comparison at the receiving end enables the supplying of a frequency and phase reference.

The phase lock loops 709, 710 and 711 enable the supplying of frequency and phase references which are sufficiently stable for the operation of the device according to the present invention. For example, the loop 709, 710, 711 enables the supplying of a frequency reference respectively to the local oscillator 250 and to the local oscillator 491 of FIG. 21 and a sampling clock signal to the digital devices of FIGS. 8 or 9. The oscillation frequencies depend on the settings of the oscillators.

The invention is applied to analog and/or digital information receiving devices, to communications between computers, to telephonic communications between exchanges, to telephonic communications between radiotelephones and communications stations, to radioelectric communications between terrestrial stations and satellites, to communications between satellites, to acoustic communications in air and/or in water, to the construction of local computer networks and to the receiving of radiophonic and television transmissions.

The present invention relates to a novel type of modulation being able to be applied to all transmissions or acquisitions of information. The invention is applied to the device using all types of waves, in particular acoustic waves, and more particularly, electromagnetic waves.

The device according to the present invention is applied, in particular, to radiophonic and television transmissions, to analog or digital information transmission devices, to communications between computers, to telephonic communications between exchanges, to telephonic communications between radiotelephones and communications stations, to radioelectric communications between terrestrial stations and satellites, to communications between two satellites, to acoustic communications in air and/or in water, to the construction of local computer networks, to sonars, to radars.

The invention is particularly well suited to high fidelity radiophonic transmissions and reception as well as to high definition television (HDTV), and/or to digital television.

We claim:

1. Method for simultaneous transmission of modulated waves using a plurality of orthogonal frequencies, in which symbols are transmitted for a period $T+\Delta T$, two transmission frequencies being separated by $1/T$, $T$ being the useful transmission interval and $\Delta T$ being the transition interval, absorbing the non-stationarities due to the arrival of echoes, in which during each transmission interval of period $T+\Delta T$ a (real part, imaginary part) or (amplitude, phase) pair is transmitted on each frequency, the (real part, imaginary part) or (amplitude, phase) pair being in one-to-one equivalence with information to be transmitted, characterised in that the number of pairs possible is greater than 4, in that the symbols transmitted are constituted periodically by reference signals enabling, at a receiving end, equalization of the transmission channel, and in that synchronisation signals are transmitted enabling, at the receiving end, processing of the signal during the useful transmission intervals of period $T$ so as to recover tie orthogonality of the channels corresponding to the orthogonal frequencies.

2. Method according to claim 1, characterised in that a ratio $\Delta T/T$ is less than or equal to $\frac{1}{8}$.

3. Method according to claim 1 or 2, characterised in that a first frequency used fo is equal to $k/T$, $k$ being a positive integer or zero.

4. Method according to any one of claims 1 or 2, characterised in that it comprises a step:
   of determination of patterns for the useful transmission interval of period $T$,
   of transmission of the pattern during a transmission interval of period $T$ and its coherent continuation by recopying of the end of the useful interval of the signal during the transition interval of period $\Delta T$.

5. Method according to any one of claims 1 or 2, characterised in that the transmission is stopped during the transition intervals.

6. Method according to any one of claims 1 or 2, characterised in that during each useful transmission interval of period $T$, a symbol is transmitted on all or part of the frequencies.

7. A transmitter system for simultaneous transmission of modulating wave using a plurality of orthogonal frequencies in which symbols are transmitted for a period $T+\Delta T$, two transmission frequencies being separated by $1/T$, $T$ being the useful transmission interval and $\Delta T$ being the transition interval and in which during each transmission interval of period $T+\Delta T$ a real part-imaginary part pair or amplitude-phase pair is transmitted on each frequency, the real part-imaginary part pair or amplitude-phase pair being in one-to-one equivalence with the information to be transmitted said system comprising:

a coding device for receiving said information to be transmitted, said coding device including a shaping means to produce a desired shape of signals and a digital conversion means receiving the output of said shaping device and providing said real part-imaginary part pair or amplitude-phase pair; and a modulation device for enabling the transmission, during a useful transmission interval of said period $T+\Delta T$ for each frequency used, of either a symbol chosen from a large plurality of amplitude, phase pairs, or a reference signal to ensure equalization of the transmission channel.

8. Transmitter according to claim 7, characterised in that the modulation device (90) comprises a device (190) for calculation of digital inverse Fourier transform for more than 1024 samples involving a processing time $\leq 100$ $\mu$s.

9. Transmitter according to either one of claims 7 and 8, wherein a channel is centered on the zero frequency carrier.

10. Transmitter according to either one of claims 7 and 8, characterised in that the modulation device (90) operates at intermediate frequency.

11. Transmitter according to either one of claims 7 and 8, characterised in that the modulation device (90) is a digital device for carrier modulation.

12. A receiver system for receiving modulated waves transmitted with a plurality of orthogonal frequencies, in which symbols are transmitted for a period $T+\Delta T$, two transmission frequencies being separated by $1/T$, $T$ being the useful transmission interval and $\Delta T$ being the transmission interval in which, during each transition interval of said period, a real part-imaginary part pair or amplitude-phase pair is transmitted on each frequency, the real part-imaginary part pair or amplitude-phase pair being in one-to-one equivalence with information to be transmitted, said receiver system comprising:

means for transposing and sampling which means are synchronous with a signal and wherein said means for transposing and sampling include a means for demodulation of a modulated wave transmission using symbols transmitted during said period $T+\Delta T$ on said plurality of orthogonal frequencies, said means for transposing and sampling further including a servocontrol device ensuring the synchronization of the receiver system with a receive signal using said transition interval $\Delta T$, said means for transposing and sampling further including a test means using reference signals for equalizing transmission channels.

13. Receiver according to claim 12, characterised in that it comprises an automatic gain control device (AGC) controlled by a device for detecting the mean power of at least part of the signal.

14. Receiver according to either one of claims 12 and 13, characterised in that it comprises at least one device (48) for calculation of the fast Fourier transform (FFT) for more than 1024 samples involving a processing time $\leq 100$ $\mu$s.

15. Receiver according to claim 14, characterised in that it comprises (real part, imaginary part) or (amplitude, phase) pair decoding means (45), in order to convert them into digital words.

16. Receiver according to claim 12, characterised in that the test means comprise a device (587) for equalisation, compensating for the perturbations in the signal coming from the transmission and in particular multiple paths due to said echoes.

17. Receiver according to any one of claims 12, 13, 15, or 16, characterised in that it comprises reorthogonalisation means (482, 4821, 4822) using the transition interval $\Delta T$ in order to render a plurality of channels orthogonal.

18. Receiver according to claim 17, characterised in that the reorthogonalisation means comprise a pattern change detection circuit.

19. Receiver according to claim 18, characterised in that the pattern change detection circuit comprises means for subtraction of the signal with a signal delayed by a period T and means for determining whether the difference is almost constant or not.

* * * * *